United States Patent [19]
Ykema

[11] Patent Number: 5,936,201
[45] Date of Patent: Aug. 10, 1999

[54] COMPACT ELECTRICAL BUS

[75] Inventor: John I. Ykema, Broomall, Pa.

[73] Assignee: SPD Technologies Inc., Philadelphia, Pa.

[21] Appl. No.: 07/948,301

[22] Filed: Sep. 21, 1992

[51] Int. Cl.$^6$ .................................... H02G 3/04
[52] U.S. Cl. .................... 174/68.3; 174/68.2; 174/70 B; 174/99 R; 174/99 B
[58] Field of Search .................... 174/68.2, 70 B, 174/72 B, 71 B, 88 B, 96, 98, 99 R, 99 B, 133 B, 129 B, 149 B, 68.3

[56] References Cited

U.S. PATENT DOCUMENTS

| | | | |
|---|---|---|---|
| 2,482,310 | 9/1949 | Adam | 174/99 B |
| 2,973,405 | 2/1961 | Zuch . | |
| 3,018,320 | 1/1962 | Rowe | 174/99 B |
| 3,081,442 | 3/1963 | Platz | 439/94 |
| 3,428,741 | 2/1969 | Zuch . | |
| 3,836,936 | 9/1974 | Clement | 439/115 |
| 4,089,578 | 5/1978 | Valtonen | 439/115 |
| 4,293,172 | 10/1981 | Lingaraju | 439/105 |
| 4,679,884 | 7/1987 | Klemp | 439/106 |
| 4,945,188 | 7/1990 | Jackson | 174/68.2 |

OTHER PUBLICATIONS

"GE Spectra Series Busway", Catalog #GET–700SA1190 BLJ, General Electric Company.
"Introducing Plugtrak, A pretty Face With Guts to Match", Catalog # K 10017, Hubbell Incorporated.
"Introducing Plugtrak, The Re–Invention of Surface Raceways", Catalog # K1006, Hubbell Incorporated.
"I–T–E Universal Lighting Duct" Selection & Applicagion Guide, Bulletin 5/1–1E, 1988, Siemens Energy & Automation, Inc.
"I–T–E Industrial Trol–E–Duct", Selection & Application Guide, Bulletin 5.2.1–1C, 1986, Siemens Energy & Automation, Inc.
"I–T–E XL–X Busway Systems", Selection & Application Guide, Bulletin 5.3.5–1D, 1989, Siemens Energy & Automation, Inc.
"I–T–E BD Busway Systems", Selection & Application Guide, Bulletin 5.3.3.–1D, 1986, Siemens Energy & Automation, Inc.
"I–T–E XJ–L Busway Systems", Selection & Application Guide, Bulletin 5.3–1D, 1988, SiIemens Energy & Automation, Inc.
"Wagner—New A–C Bus Design", pp. 448, 449 & 450, May 1948 Edition of Electrical Engineering.
Product Bulletin—"Speedfax"—ITE Imperial, Mar. 1975.

*Primary Examiner*—Hyung-Sub Sough

[57] ABSTRACT

A compact electrical bus includes an axially elongated conduit, an axially elongated insulator within the conduit and spaced apart axially elongated electrical conductors lying along the insulator for carrying electrical power. Optionally, fiber optic cables may be axially routed through the conduit.

6 Claims, 19 Drawing Sheets

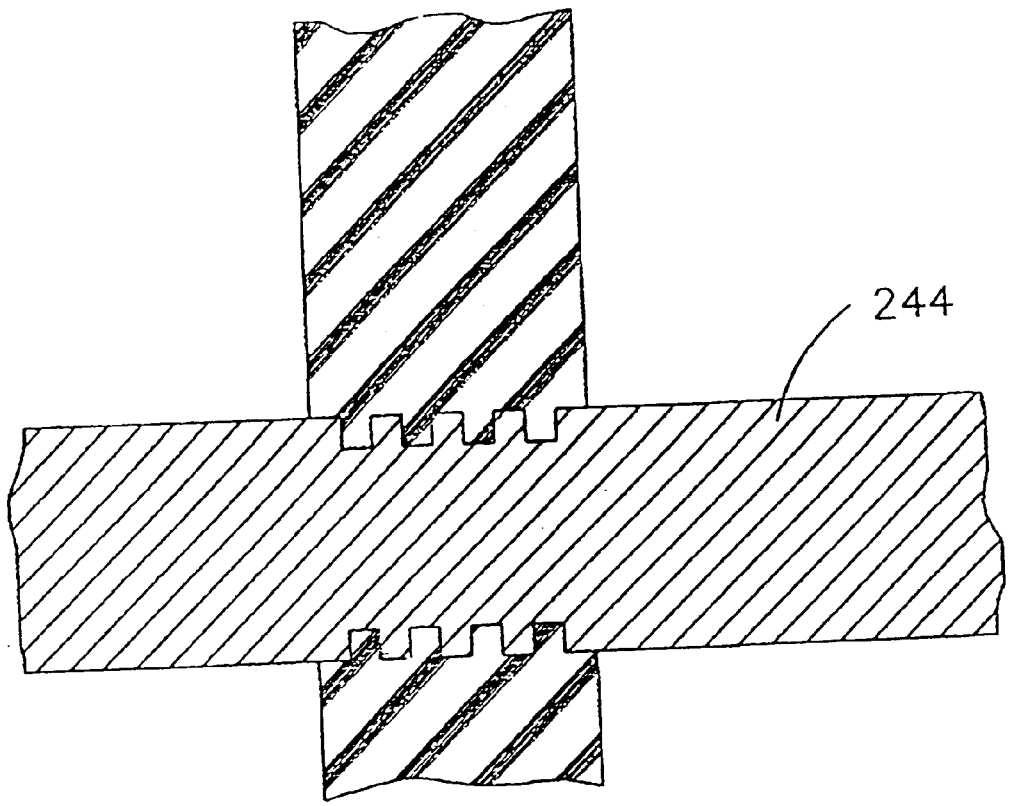
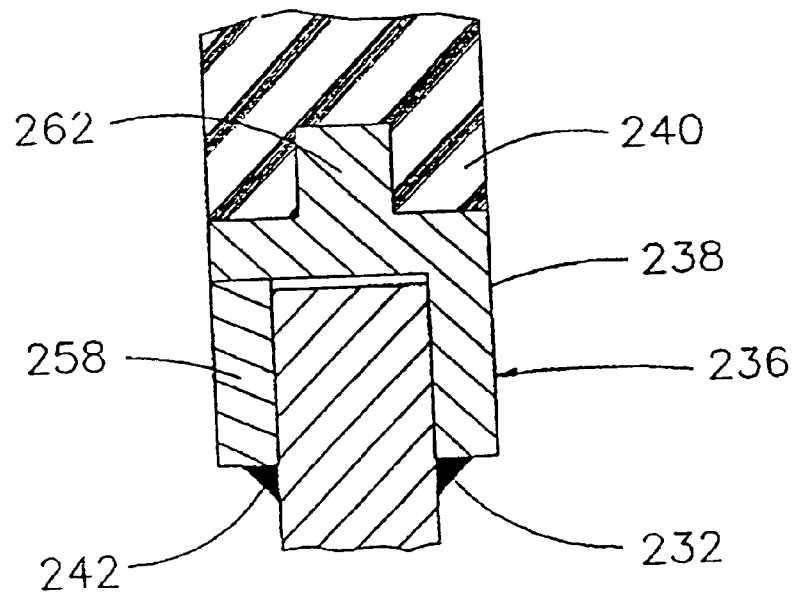
Fig. 15

COMPACT ELECTRICAL BUS

BACKGROUND OF THE INVENTION

1. Field of the Invention

This invention relates to electrical power transmission equipment, specifically to three phase electrical power transmission equipment and to direct current electrical power transmission equipment.

BACKGROUND OF THE INVENTION

2. Description of the Prior Art

Means for transmitting three phase electrical power are known and include conventional lines and cabling used in utility, industrial and nautical applications. Means for transmitting direct current electrical power are also known.

A disadvantage associated with conventional transmission lines is that substantial inductance may be present.

An additional problem inherent in much of the prior art equipment for transmitting three phase electrical power is lack of impedance balance between phases.

There is a continuing need in heavy duty industrial and nautical applications for three phase electrical power transmission equipment having a high degree of impedance match among phases while having low inductance. Additionally, there is a continuing need for such equipment in small, light-weight form. Small size and light weight are especially desirable characteristics in three phase power transmission equipment intended for nautical applications.

There is also a continuing need in heavy duty industrial and nautical applications for direct current power transmission equipment having high efficiency with minimal component costs and exhibiting minimal cost for installation and replacement. Such direct current power transmission equipment should have minimum size, minimum mass and exhibit maximum survivability with low fire hazard in the event of a catastrophe; this is especially desirable for nautical applications.

SUMMARY OF THE INVENTION

In one of its aspects this invention provides a compact low inductance three phase electrical bus including an axially elongated conduit. Within the conduit are means dividing the conduit into a number, preferably three, of equiangular axially elongated zones electrically insulated from one another. Within each of the zones are spaced apart axially elongated conductive means for carrying respective phases of three phase electrical power. Preferably, the means dividing the conduit into zones is electrically insulative.

In a preferred three-phase embodiment of the invention, the dividing means is an axially elongated Y-shaped insulator in the conduit, with legs of the Y-shape contacting the conduit. When the dividing means is an insulator of the preferred Y-shape, the invention further includes spaced apart axially elongated electrically conductive members lying along the insulator.

Preferably, the conduit is of circular cross-section. However, the conduit may be of polygonal cross-section. If the conduit is of polygonal cross-section, it preferably is of right polygonal configuration.

When the dividing means is provided as the preferred equiangular Y-shaped insulator, legs of the Y-shape defining the insulator are preferably radially elongated relative to leg thickness.

In the preferred three phase embodiment, the conductive members preferably lie substantially along the legs of the Y-shaped insulator. The conductive members most preferably facingly contact the legs of the Y-shaped insulator. Axially extending surfaces of the radially extending legs of the Y-shaped insulator are preferably generally planar, facilitating facing contact with the conductive members.

Facing surfaces of respective conductive members are preferably spaced from the conduit interior to define at least one axially elongated void within the conduit. Most preferably, a plurality of axially elongated equiangularly shaped voids are defined within the conduit. This facilitates axial routing of axially elongated fiber optic transmission means within the conduit, between the conduit wall and at least one of the axially elongated electrically conductive members.

In the three phase embodiment of the invention, the conductive members may each include two axially elongated conductive portions connected by a portion which is curved respecting the axis of the conduit defining the periphery of the bus.

In the three phase embodiment of the invention, most preferably the insulative dividing means is defined by a single, unitary member. Alternatively, in the three phase embodiment of the invention, the dividing means may be defined by three identical interchangeable insulative members, each of which includes a base adapted for close fitting contact with the interior of the conduit. Each of the three identical interchangeable members further includes a leg extending radially from the base and a nib at the leg radial extremity remote from the base; preferably, the tips of the respective legs abut one another and are retained together by epoxy or other suitable cement. Optionally, the radially inner extremity of the legs of the respective interchangeable members may be formed into or equipped with nibs. The optional nib optionally engages corresponding nibs of the remaining two insulative members.

Preferably, the bases of the insulative members retain radially outboard extremities of the conductive members on respective sides of the legs of the insulative members, thereby maintaining the conductive members spaced from the conduit.

In another of its aspects, this invention provides a compact, modular direct current bus including an axially elongated preferably generally rectangular conduit, a pair of axially elongated generally rectangular positive and negative conductive members within the conduit and insulative means for maintaining the conductive members spaced from the conduit and from each other. In one of these alternative embodiments, the insulative means may include a first axially elongated insulative planar spacer facingly contacting and separating the conductive members one from another. The insulative means may further desirably include a pair of axially elongated second insulative planar spacers facingly contacting the inner surface of the conduit and may yet further include a pair of axially elongated insulative blocks receiving respective edges of the first axially elongated insulative spacer and facingly contacting additional outwardly facing surfaces of the positive and negative conductive members.

In yet a further alternate embodiment, the invention provides a modular direct current bus including the axially elongated conduit and the pair of axially elongated positive and negative conductive members noted immediately above. In this yet further alternate embodiment, the direct current bus further includes an axially elongated preferably rectangular conductive member between the positive and negative conductive members. In such case, the insulative means, for maintaining the conductive members spaced from the conduit and from each other, includes axially elongated insulative planar spacer members which facingly contact and separate the conductive members one from another and from the conduit. The insulative means yet further includes a pair of axially elongated insulative blocks engaging respective edges of at least one of the axially elongated planar spacer members and facingly contacting surfaces of the positive and negative conductive members which are distinct from the surfaces contacted by the planar spacer members.

In both of the direct current bus embodiments of the invention, there may optionally be provided axially elongated fiber optic cable within the conduit. Desirably, the fiber optic cable resides within one or more axially elongated passageways resulting from transverse length of the insulative members being less than the combined transverse length of the conductive members.

In the direct current embodiments of the invention, the conduit is preferably generally rectangular.

BRIEF DESCRIPTION OF THE DRAWINGS

FIG. 15 is an enlarged broken detailed view, taken at the area of circle 15 in FIG. 13, illustrating the manner in which a conductive member is retained in place by an insulative portion of structure facilitating passage of a direct current electrical bus through a bulkhead or structural wall.

Figure 1:
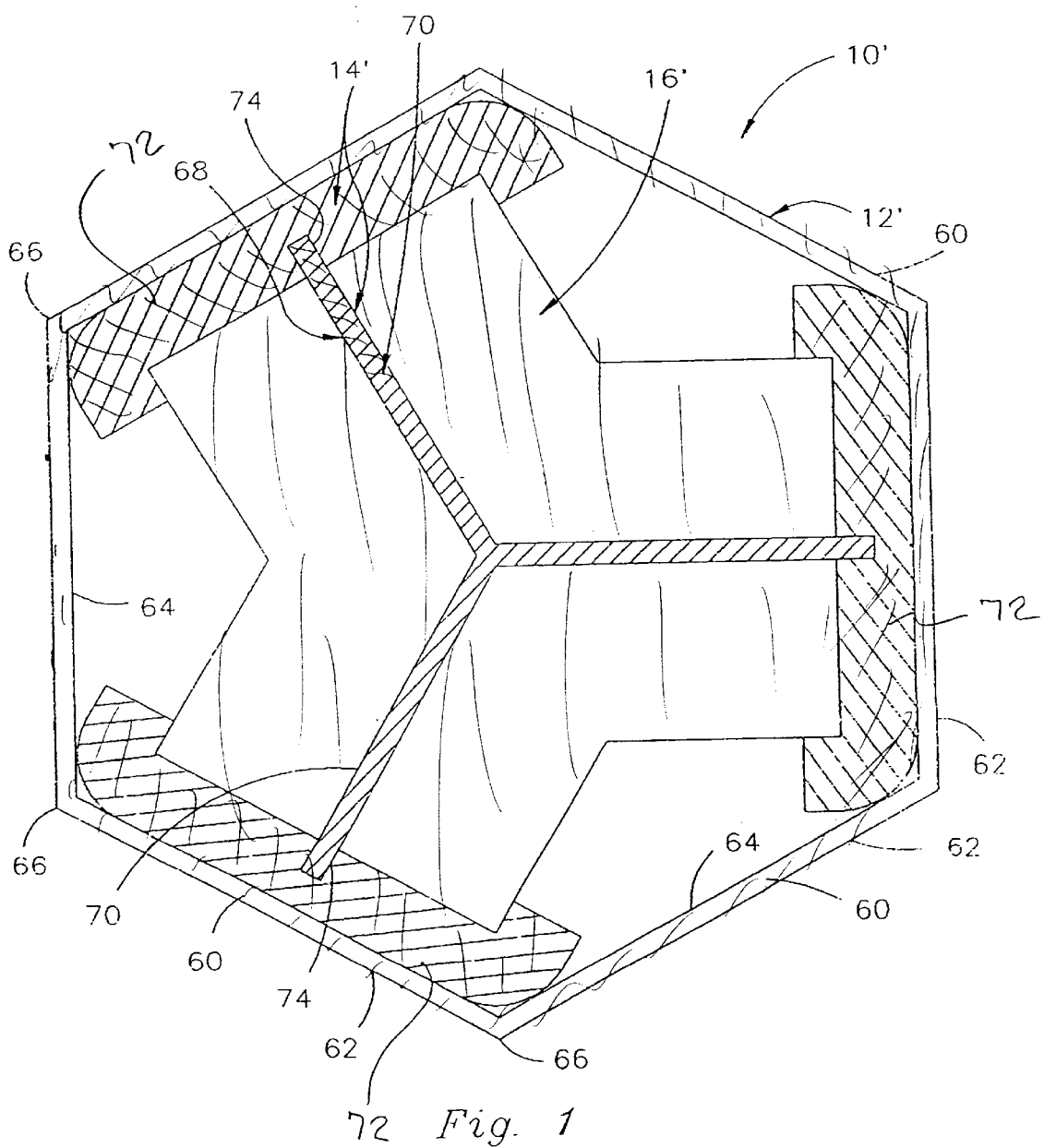
FIG. 1 is schematic axial cross-sectional view of one embodiment of an electrical bus for carrying three phase electrical power, manifesting aspects of the invention.

Numbers in the drawings correspond to numbers in the following description. In the drawings, effort has been made to utilize the practice whereby components in the preferred embodiments are identified with unadorned numbers, e.g. 6, which do not have any prime notation. Hence, in the drawings, numbers with prime notation, e.g. 6', denote embodiments and components thereof analogous to the preferred embodiments and the components thereof identified by correspondingly unadorned numbers.

DESCRIPTION OF THE PREFERRED EMBODIMENTS AND BEST MODE KNOWN FOR PRACTICING THE INVENTION

Referring to FIG. 1, one embodiment of a compact low inductance electrical bus for carrying three phase electrical power is shown in section and is designated generally 10'. Bus 10' includes an axially elongated conduit 12' and means for dividing conduit 12' into three preferably equiangular axially elongated zones which are electrically insulated from one another.

In FIG. 1, conduit 12' is of generally hexagonal shape. Conduit dividing means is provided by an insulator assembly designated generally 14'. Also included as a portion of bus 10' are preferably spaced apart and axially elongated conductive means, designated generally 16' in FIG. 1, for carrying respective phases of three phase electrical power.

In the embodiment illustrated in FIG. 1, conduit 12' is defined by six planar sides, each of which is designated generally 60, with the six sides together defining a hexagonal cross-section for conduit 12'. Each planar side 60 has an outwardly facing surface 62 and an inwardly facing surface 64. Adjacent planar sides of conduit 10' adjoin one another at vertices 66.

In the FIG. 1 embodiment, insulator assembly 14' is in part defined by a Y-shaped member 68 which includes three equal length radially extending legs 70 positioned equiangularly apart so that each pair of legs 70 subtends an angle of 120 degrees therebetween.

Insulator assembly 14' further includes three preferably identical base members 72, each of which preferably facingly contacts one of inwardly facing surfaces 64 of a side 60. Each base 72 includes a groove 74 for close-fitting receipt of a radial extremity of a leg 70 of Y-shaped member 68. As shown in FIG. 1, the legs of insulator assembly 14' are preferably defined by a single integral member.

Figure 2:
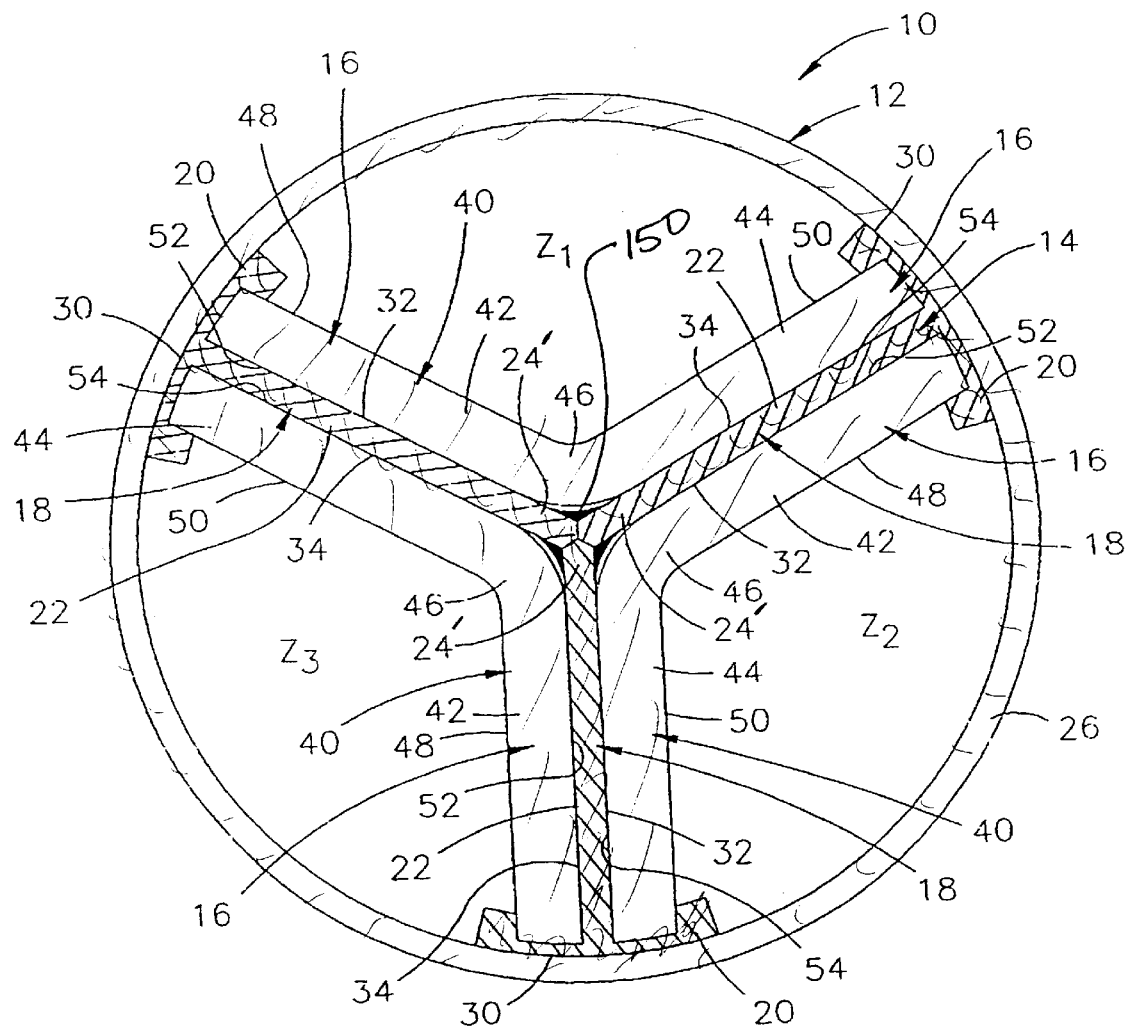
FIG. 2 is an axial cross-sectional view of a preferred embodiment of an electrical bus for carrying three phase electrical power, manifesting aspects of the invention.
Figure 3:
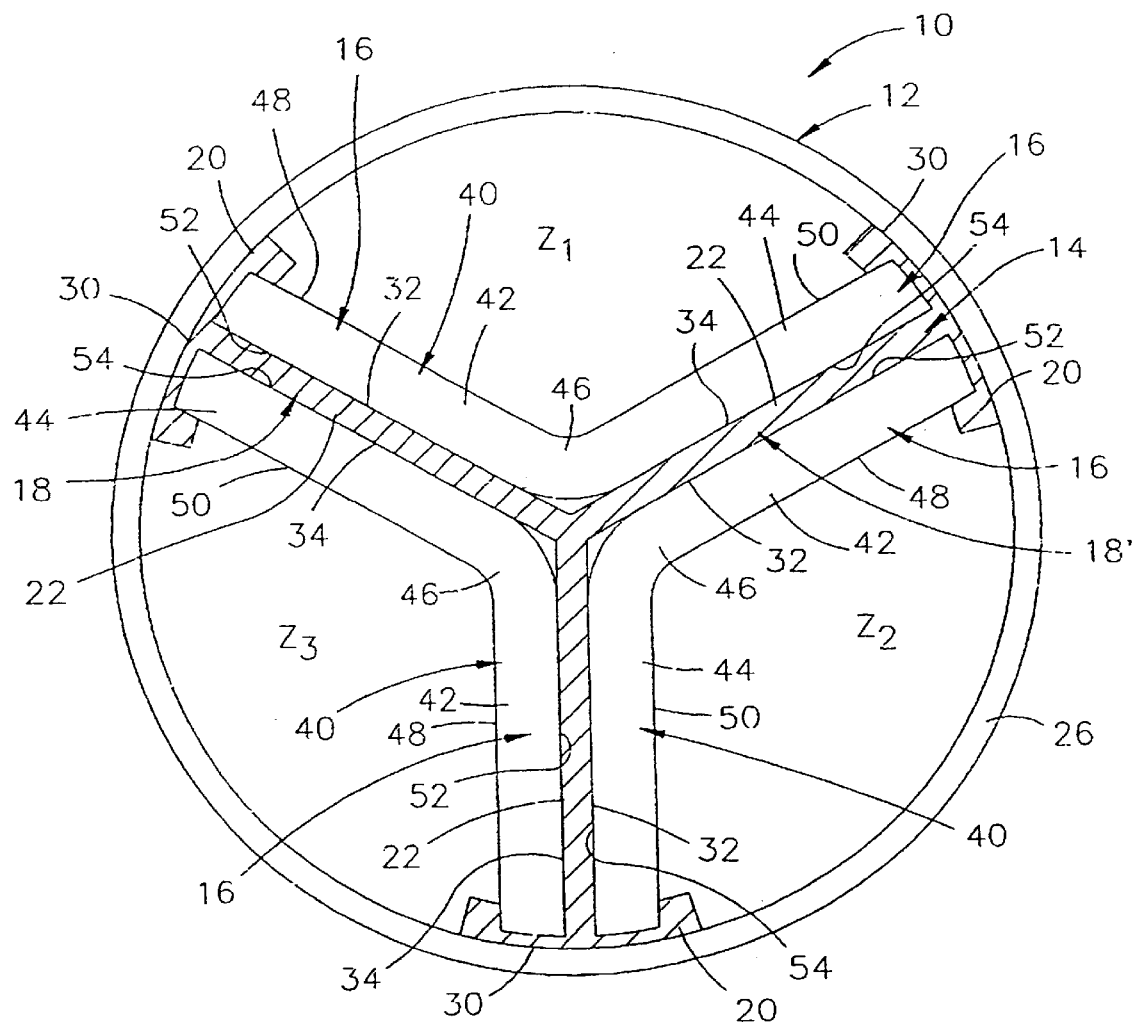
FIG. 3 is an axial cross-sectional view of another preferred embodiment of an electrical bus for carrying three phase electrical power, similar to that shown in FIG. 2.
Figure 4:
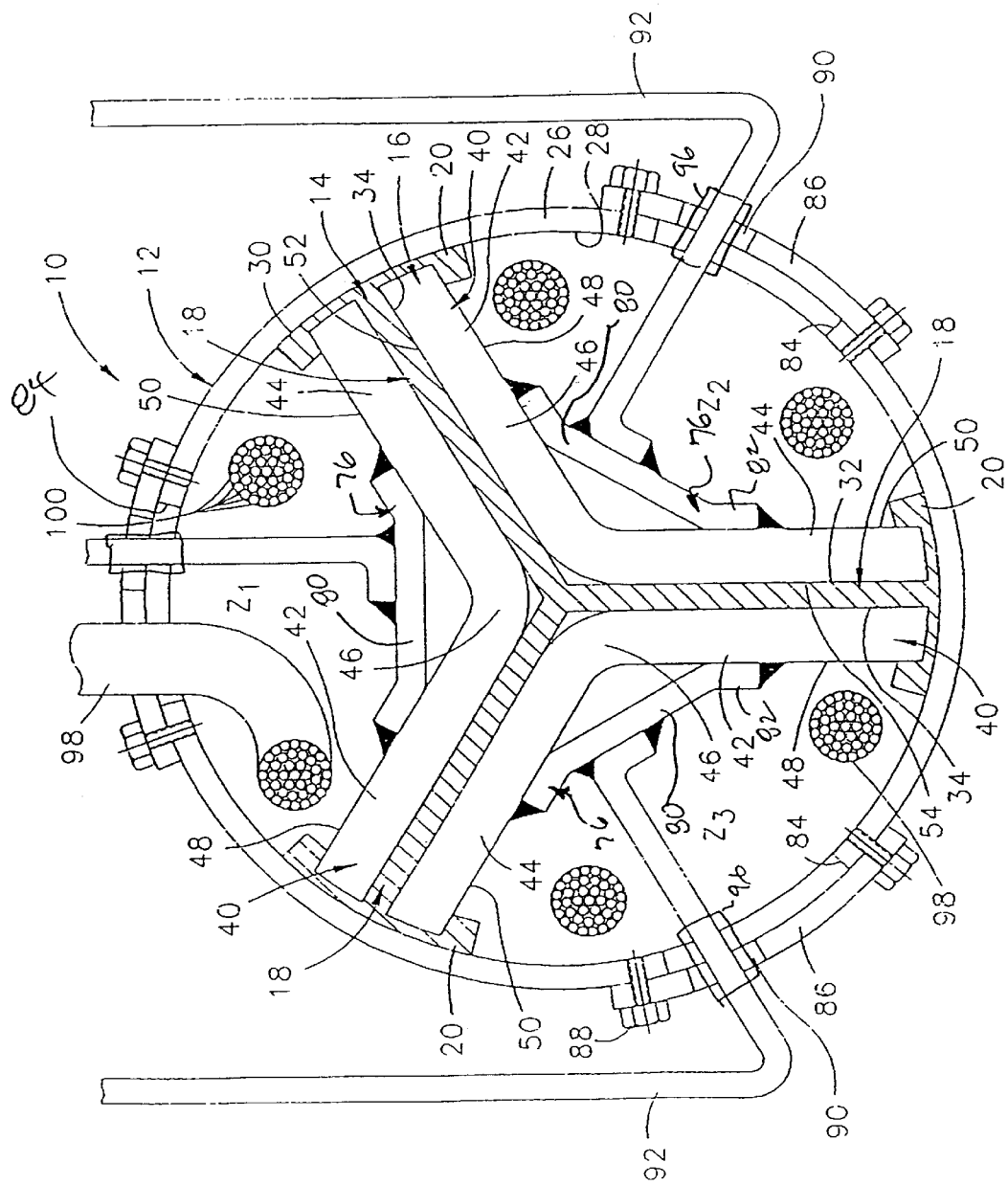
FIG. 4 is an axial cross-sectional view of the preferred embodiment of an electrical bus for carrying three phase electrical power shown in FIG. 3, including breakout structure for carrying electrical power through the conduit wall of the bus.

Referring generally to FIGS. 2, 3 and 4, a compact low inductance electrical bus for carrying three phase electrical power according to a preferred embodiment of the invention is shown in section and designated generally 10. Bus 10 includes an axially elongated conduit 12 and means for dividing conduit 12 into three preferably axially elongated equiangular zones which are electrically insulated from one another. In FIGS. 2, 3 and 4, the conduit dividing means is provided by insulative means, defined by an insulator designated generally 14, Insulator 14 is illustrated in FIG. 2 as being defined by an assembly of three identical parts; insulator 14 is illustrated in FIGS. 3 and 4 as being defined by a single integrally formed part. The single integrally formed part construction illustrated in FIGS. 3 and 4 is the preferred construction.

Also included as a portion of bus 10 are preferably spaced apart axially elongated conductive means, designated generally 16 in FIGS. 2, 3 and 4, for carrying respective phases of three phase electrical power.

Conduit 12 preferably has circular periphery and a uniform thickness wall. Conduit 12 is shown in cross-section in FIGS. 2, 3 and 4, but has not been cross-hatched in FIGS. 2, 3 or 4 to assure drawing clarity.

Insulator 14 is axially elongated, in the direction perpendicular to the plane of the paper in FIGS. 2, 3 and 4. Insulator 14 is preferably equiangularly Y-shaped, as illustrated in FIGS. 2, 3 and 4, and divides conduit 12 into the three axially elongated zones which are electrically insulated from one another. The axially elongated zones defined by insulator 14 within conduit 12 are designated $Z_1$, $Z_2$ and $Z_3$ respectively in FIGS. 2, 3 and 4.

Insulator 14, whether in the assembly embodiment illustrated in FIG. 2 where three identical, separate and interchangeable insulator members define insulator 14 or whether in the integral embodiment illustrated in FIGS. 3 and 4 where insulator 14 is a single integral piece, may be considered to include three insulator members each of which is designated 18 (or 18', as appropriate) in FIGS. 2, 3 and 4. Each insulator member 18 includes a base 20, a leg 22 extending radially inwardly from base 20 and a tip. The tips, preferably somewhat pointed, abut one another at substantial angles of substantially 120°.

Optionally, in the "assembly" embodiment illustrated in FIG. 2, each insulator member may include a nib at the radially inboard extremity of a respective leg 22. Each nib may be adapted for engagement with nibs of the respective two remaining insulator members 18 such that the three insulator members 18 lockingly engage one another at the nibs along the axis of conduit 12.

Alternatively, the tapered tips (or the optional nibs) may be secured together using suitable glue or cement designated generally 150 in FIG. 2.

In the preferred construction illustrated in FIGS. 3 and 4, insulator 14 may be formed as a single extruded member 18' with the three legs 22 joined together (at the position of convergence defined by the leg tips 24' in the embodiment illustrated in FIG. 2.) Forming insulator 14 in a single piece such as by extrusion may yield substantial manufacturing efficiencies by reducing the need for manual application of cement to the tips 24 or optional nibs of the insulator members 18.

As illustrated in FIGS. 2, 3 and 4, conduit 12 preferably has an annular wall 26 of substantially constant thickness around the entire three hundred sixty degree circle defining conduit 12. As a result, an inner surface 28 of wall 26 is arcuate and concave.

Each base 20 of an insulator member 18 has a surface 30 which is radially convex and formed for complemental facing contact with inner surface 28 of conduit wall 26. (Surfaces 30 on each base 20 of each insulator member 18 have been numbered in FIG. 2, but have not been numbered in FIGS. 3 and 4 for drawing clarity.) Each radially outwardly facing surface 30 of a base 20 is preferably axially elongated, as is the remainder of the associated insulator member 18. Accordingly, insulator members 18 preferably extend axially continuously substantially the axial length of bus 10 within conduit 12; insulator members 18 preferably are not intermittent or only periodically positioned along the axis of conduit 12. As a result, there is substantially no communication between zones $Z_1$, $Z_2$ and $Z_3$.

Each leg 22 of an insulator member 18 is preferably radially elongated relative to its thickness, i.e. each leg 22 extends further in the radial direction than its thickness shown in section in FIGS. 2, 3 and 4. Each leg 22 includes respective axially elongated surfaces 32, 34, both of which are preferably generally planar. The planes defining surfaces 32, 34 are preferably parallel so that each leg 22 is of substantially constant thickness in the radial direction.

Each optional nib at a radially inboard extremity or tip 24' of a leg 22 may further optionally include a tongue and a groove, with the groove being sized and shaped to receive a tongue from a corresponding, interchangeable insulator member 18 positioned so that an angle of substantially one hundred twenty degrees is subtended by the two engaging insulator members 18.

Conductive means 16 preferably lies along insulator 14 and further preferably includes three spaced apart axially elongated electrically conductive members 40. Each conductive member 40 is preferably in facing contact with respective facing surfaces 32, 34 of respective legs 22 of two adjacent and structurally connected insulator members 18.

Most preferably each conductive member 40 lies substantially along the entire radial lengths of legs 22 of the two adjacent insulator members 18.

Each conductive member 40 preferably includes two axially elongated portions 42, 44 connected by a portion 46 which is convexly curved respecting the radial direction, as illustrated in FIGS. 2, 3 and 4. Axially elongated portions 42, 44 and convexly curved portion 46 have not been numbered at each occurrence in FIGS. 2, 3 and 4 to improve drawing clarity.

While reference is made to various portions of conductive member 40, such as "two axially elongated portions 42, 44", member 40 is preferably a single piece, most preferably either an extrusion formed to shape or a flat bus bar which has been formed to the shape illustrated in the drawings.

Each base 20 of an insulator member 18 preferably includes two axial grooves formed therein receiving radially outboard extremities of respective conductive members as shown in FIGS. 2, 3 and 4. The grooves, which are generally axially elongated, in bases 20 of insulator members and the radially outboard extremities of conductive members 40, have not been numbered in FIGS. 2, 3 and 4 to improve drawing clarity.

First and second axially elongated portions 42, 44 of each conductive member 40 include surfaces 48, 50 facing one another. Surfaces 48, 50 are spaced from conduit 12 to define, together with inner surface 28 of wall 26 of conduit 12, an axially elongated void or zone $Z_1$ (or $Z_2$ or $Z_3$) within conduit 12. Surfaces 48, 50 have not been numbered at each occurrence in FIGS. 2, 3 and 4 to improve drawing clarity.

Each conductive member 40 also includes surfaces 52, 54 which may be considered convexly facing surfaces. Surfaces 52, 54 do not face one another, but rather facingly contact surfaces 32, 34 of respective legs 22 of insulator members 18. Surfaces 52, 54 on each conductive member 40 have been numbered in FIG. 2, but have not been numbered in FIGS. 3 and 4 to improve drawing clarity.

Each conductive member 40 may have a larger, or a smaller, cross-section in the axial direction illustrated in FIGS. 2, 3 and 4, than an insulator member 18. Similarly, each of first and second axially elongated portions 42, 44 of each conductive member 40 may have a larger, or a smaller, cross-section in the axial direction than does an insulator member 18. The relative sizes and specifically the relative cross-sectional areas in the axial direction of the conductive and the insulative members depends on the voltage and current characteristics of power to be carried by the bus.

Bonding may be provided at the interface of conductive member 40 and insulator 14. Such bonding desirably eliminates any air voids which, if present, could lead to corona thereacross.

Respecting the cement used to secure tips 24' together in the embodiment illustrated in FIG. 2, an insulating compound may be used at such locale to eliminate air space by filling the volume around the tips.

Referring to FIG. 4, breakout structure is provided for electrically connecting bus conductive members 40 to a supply of three phase electrical power or to a device using three phase electrical power. As best illustrated in FIG. 4, the breakout structure includes connector flanges 76 which are preferably welded to respective conductive members 40; suitable weldments are shown but not numbered in FIG. 4, optionally (but less desirably) bolts may be used to hold flanges 76 in place by engaging tapped holes in respective first and second axially elongated portions of conductive members 40. The welding, or the less desirable bolt arrangement, assures good electrical contact between connector flanges 76 and an associated conductive member 40. When bolts are used, in addition to threadedly engaging tapped holes formed in conductive members 40, the bolts are preferably welded to connector flanges 76.

Each connector flange 76 preferably includes end portions which are substantially flat and adapted for facing contact with respective concavely facing surfaces 48, 50 of associated conductive member 40. These end portions of each connector flange 76 have not been numbered in the drawings, to avoid excess drawing clutter.

Each connector flange 76 yet further includes a central portion 80 spaced away from the curved central portion 46 of an associated conductive member 40 and connected to the extremities of connector flanges 76 by intermediate bar portions 82. Preferably, connector flanges 76 are somewhat axially elongated.

At the vicinity of each connector flange 76, conduit 12 has an axially elongated opening 84 formed therein. Opening 84 is positioned to be substantially radially outboard of central portion 80 of a connector flange 76. As illustrated in FIG. 4, each opening 84 is preferably covered by a plate 86 secured in place over opening 84 via bolts 88 threadedly engaging unnumbered tapped holes in the wall of conduit 12. Cover plate 86 is curved to conform to the curved outer surface of conduit 12.

Cover plates 86 have openings 90 formed therein for passage therethrough of connector rods 92 affixed and electrically connected to flanges 76 preferably by welding, as illustrated; connector rods 92 may also be bolted to flanges 76. Connector rods 92 are preferably insulated from the wall 26 of conduit 12 by suitable doughnut-shaped insulators 96 which preferably fit about connector rods 92 much in the form of grommets, as illustrated in FIG. 4. Alternatively, connector rods 92 may be insulated from conduit 12 at openings 90 by suitable insulators which are attached to cover plates 86 and are formed about the inside surface of openings 90.

Connector rods 92 may be insulated outside of bus 10, depending on the level of voltage in the connector rods.

Connector rods 92 connect with flanges 76 proximate the midpoint of flanges 76 so that power is delivered by connector rods 92 substantially equally to respective first and second axially elongated portions 42, 44 of a conductive member 40. Openings 90 in cover plates 86 overlie openings 84 in conduit 12 and are of sufficient size that connector rods 92 and their doughnut-like insulators 96 may pass therethrough without contact (and resultant electrical connection) of the connector rods 92 with the peripheries of openings 90.

Still referring to FIG. 4, the connector flanges are shaped so that outboard portions thereof facingly contact respective first and second axially elongated portions 42, 44 of an associated conductive member 40 close to the midpoints of portions 42 and 44. Connector flange 76 is shaped so that the central portion thereof is somewhat proximate to but yet still spaced from curved portion 46 of an associated conductive member 40.

The shape of connector flanges 76, as illustrated in FIG. 4, permits axial routing of fiber optic cables within axially elongated zones $Z_1$, $Z_2$ and $Z_3$. The fiber optic cables are designated generally 98 and include a number of fiber optic strands or filaments 100 bundled together.

As illustrated in FIG. 4, a fiber optic cable 98 may pass through an opening 84 to enter an appropriate zone such as zone $Z_1$. Cover plate 86 may have a second opening to permit a fiber optic cable 98 to pass therethrough into a desired axially elongated zone within conduit 12.

Figure 5:
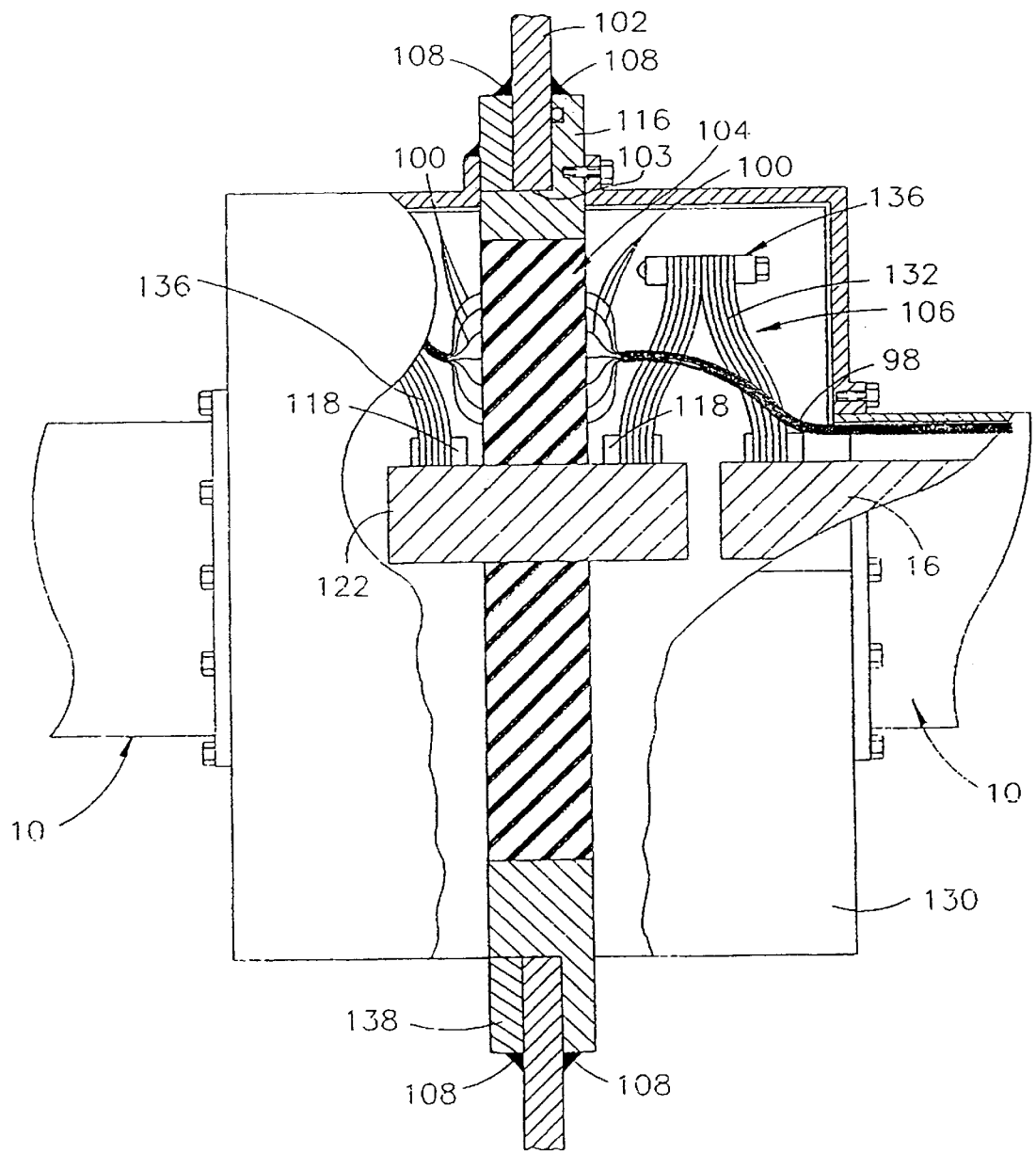
FIG. 5 is a side view, partially broken away and partially in section, illustrating a preferred embodiment of structure facilitating passage through a structural wall of an electrical bus for carrying three phase electrical power which includes fiber optic transmission lines, as shown generally in FIG. 4.
Figure 6:
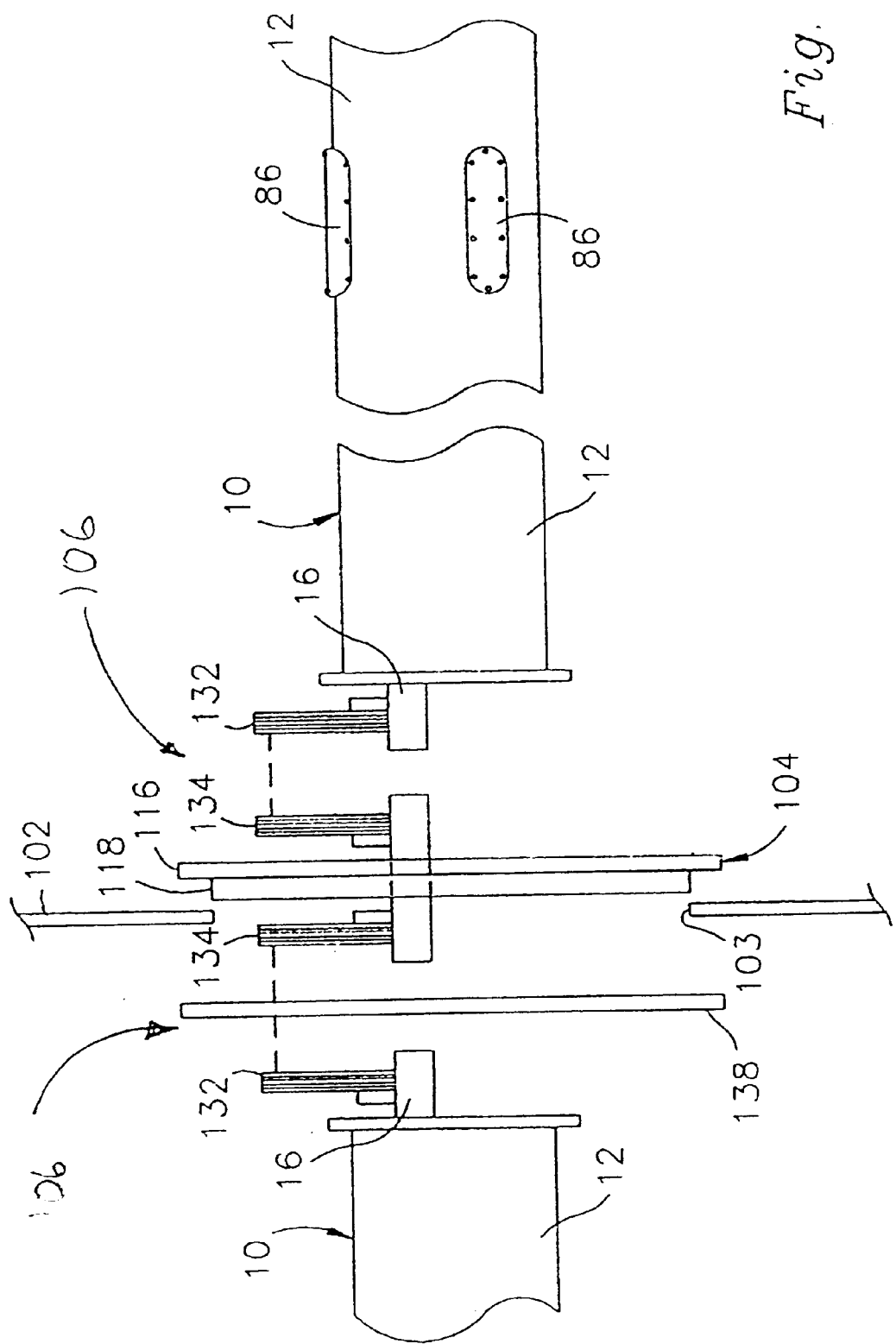
FIG. 6 is an exploded side view of the structure facilitating passage through a structural wall of an electrical bus, as shown generally in FIG. 5 but without fiber optic transmission lines.

Structure utilized to permit electrical connection of two segments of a three phase electrical bus, embodying aspects of the invention, through a structural wall is illustrated in FIGS. 5 and 6. Structural wall or bulkhead 102 has an opening cut therethrough with the periphery of the opening designated 103 in FIG. 5.

A bonded insulative member designated generally 104 in FIG. 5 is fitted into the opening in wall or bulkhead 102. Bonded insulative member 104 is illustrated in greater detail in FIG. 9 and preferably includes a support ring 116, which is preferably metal, with insulator material 118 bonded to and within ring 116. Support ring 116 is preferably welded to wall or bulkhead 102 via welds 108 illustrated in FIG. 5.

Figure 9:
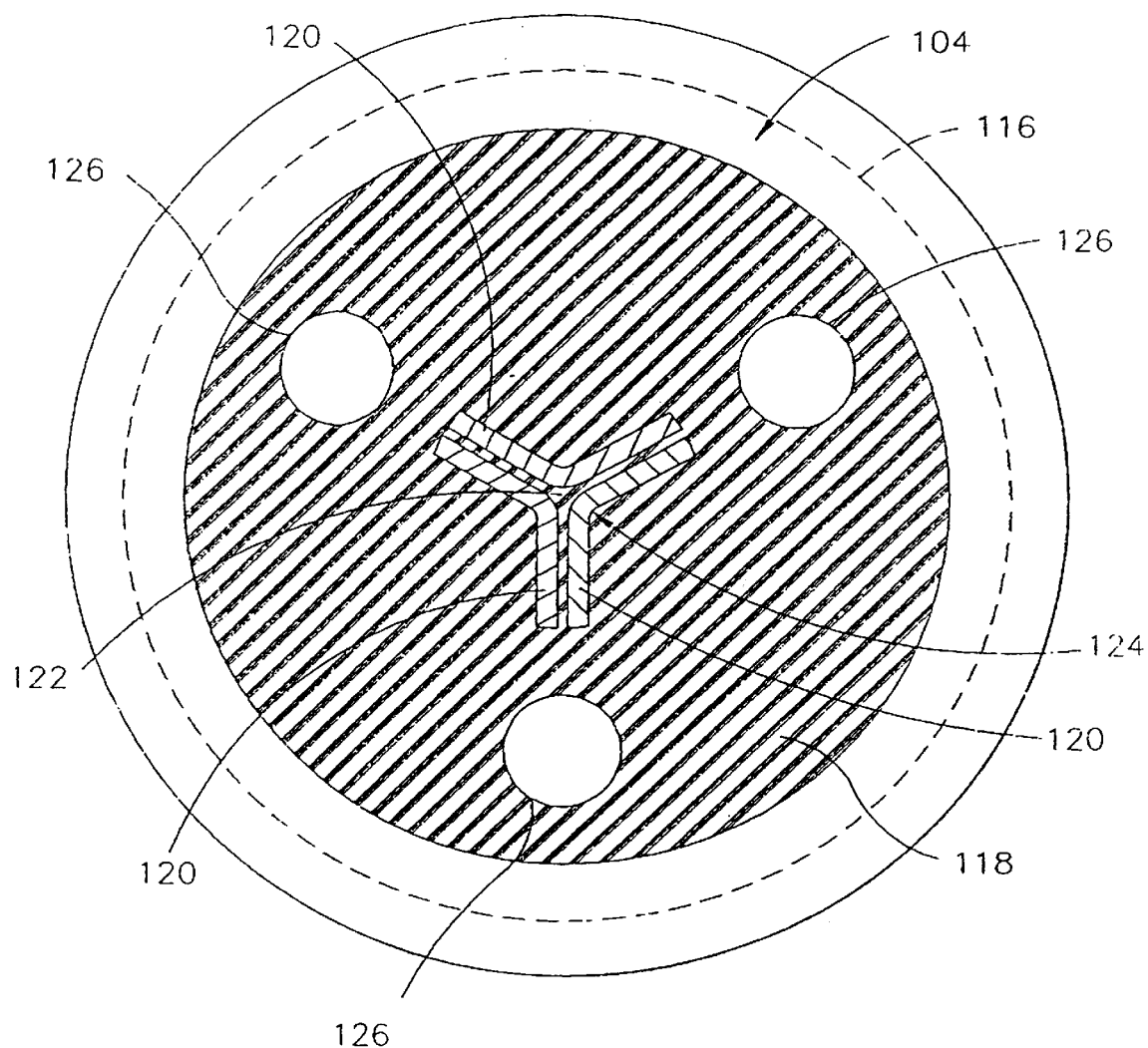
FIG. 9 is a simplified sectional view taken at lines and arrows 9—9 in FIG. 5.
Figure 10:
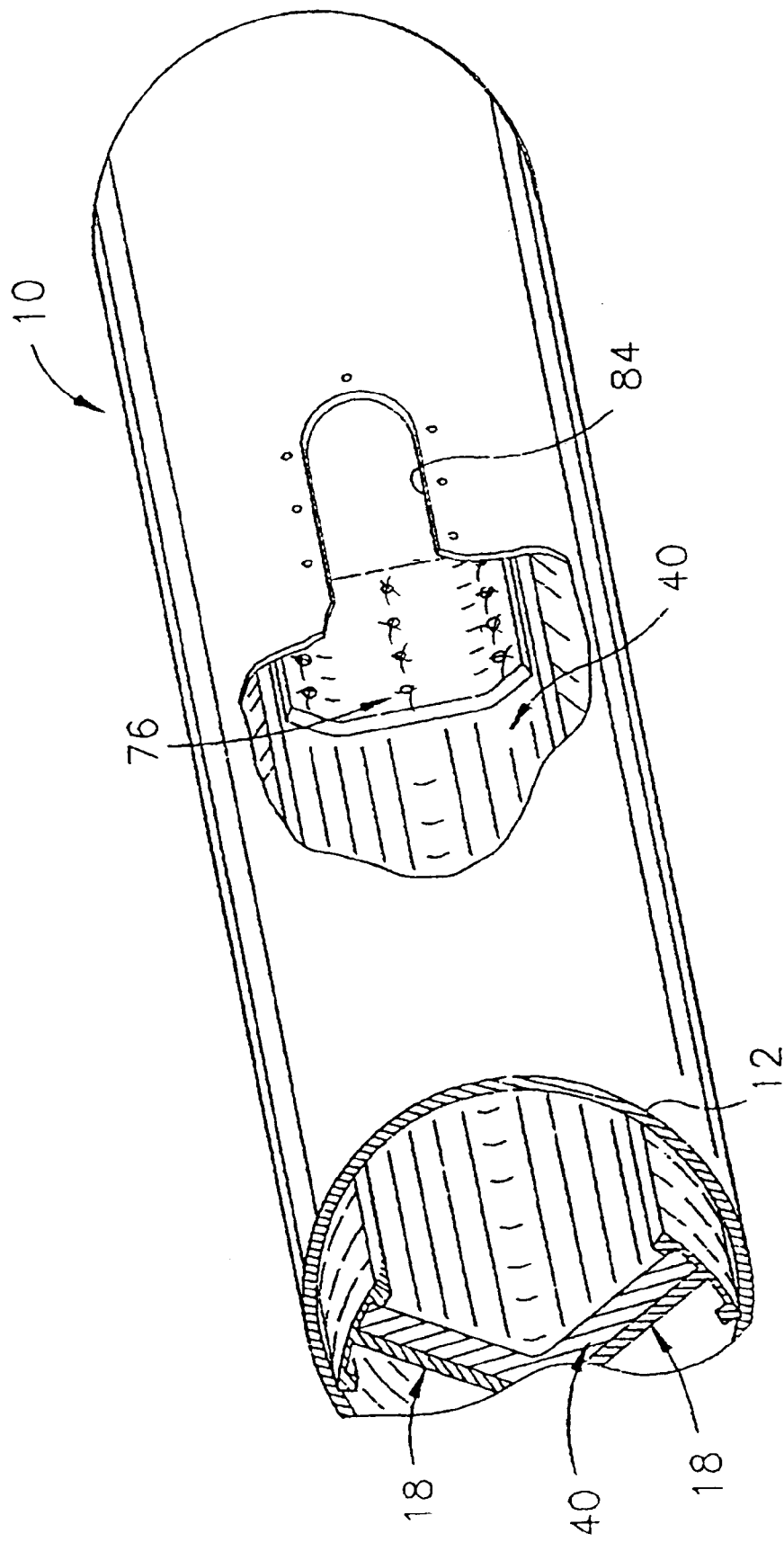
FIG. 10 is a partially broken isometric view of an electrical bus manifesting aspects of the preferred embodiment of the invention, illustrating a portion of the breakout structure shown in FIG. 4.

Referring generally to FIG. 9, bonded insulative member 104 further includes three conductive members 120 positioned at the center thereof and spaced from one another by insulator material 118. Conductive members 120 and insulator material 118 are bonded together as insulator material 118 is fabricated within ring 116. Conductive members 120 are preferably of the same size and cross-sectional shape as conductive members 40 of bus 10. The portion of insulator material 118 which separates respective conductive members 120 is preferably substantially the same size and cross-section as insulator assembly 14 within bus 10. Conductive members 120, together with the portions of insulator material 118 between respective conductive members 120, define a bus feed-through member.

Bonded insulative member 104 yet further preferably includes one or more fiber optic feed-though panels. Three of these panels are illustrated schematically as circles in FIG. 9 and have been designated generally 126.

Once bonded insulative member 104 is in place in wall or bulkhead 102, electrical connection is affected between respective conductive members 40 of bus 10 and conductive members 120 of bonded insulative member 104 via flexible strands 132 and 134. Preferably, flexible strands 132 and 134 are electrically connected, most preferably by welding, to radial extremities of conductive members 40 and 120, with a separate conductive strand being welded to each of the respective radial extremities of conductive members 40 and 120 as depicted schematically in FIG. 6.

Optionally, an insulated box or container 130 may be provided around the connections between bus 10 and bonded insulative member 104. Box or housing 130 may desirably be bolted in place as illustrated in FIG. 5.

FIG. 6 further illustrates the manner in which two sections of bus 10 are connected through structural wall or bulkhead 102. In FIG. 6, the character of bonded insulative member 104 is illustrated whereby member 104 includes support ring 116 and insulator material 118. Support ring 116 is of larger outer diameter than insulator material 118 while insulator material 118 extends angularly around respecting support ring 116 in a manner to preferably facingly contact circular periphery 103 of the opening in the wall or bulkhead 102.

In FIG. 6, strand members forming a portion of a flexible coupler 106 are illustrated. First strands 132 connect, preferably by welding, to respective conductive members 40 of bus 10 and extend radially from the respective conductive members to which first strands 132 are connected. Second strands 134 are connected, preferably by welding, to respective conductive members 120 forming a portion of bonded insulative member 104. Second strands 134 similarly extend radially from the respective conductive member 120 to which they connect. Respective first and second strands 132, 134 are angularly aligned due to the substantial alignment of respective conductive members 40 defining zones $Z_1$, $Z_2$ and $Z_3$ with respective conductive members 120 forming component parts of insulative member 104.

Respective co-angularly positioned first and second strands 132, 134 are connected together via a bolting connector 136 as illustrated generally in FIG. 5. The connection provided by bolting connector 136 is along the dotted line connecting first and second strands 132, 134 in FIG. 6. Bolting connector 136 has not been illustrated in FIG. 6 to assure drawing clarity. While only one pair of connected strands 132, 134 is shown in FIG. 6, it is to be understood that similar pairs of connected strands are provided for each of the respective angularly spaced, axially aligned sets of conductive members 40 and 120.

Further provided as a portion of the structure via which two segments of bus 10 may be connected is a separate, second support ring 138 shown in FIGS. 5 and 6. Second support ring 138 is preferably of substantially the same diameter as support ring 116 forming a portion of bonded insulative member 104. Second support ring 138 has sufficiently large inner diameter that bolting connection between first and second strands 132, 134, to the left of wall 102 in FIG. 6, may be affected without contact with the inner periphery of second support ring 138.

Respective first and second strands 132, 134, which are connected by bolting connector 136, are preferably angularly aligned with respect to the centerline of the conduit; this results from the substantial angular alignment of respective conductive members 40 in zones $Z_1$, $Z_2$ and $Z_3$ with corresponding conductive members 120 of bonded insulative member 104.

Box or housing 130 may be split substantially along a horizontal plane passing through the center of bus 10.

Figure 7:
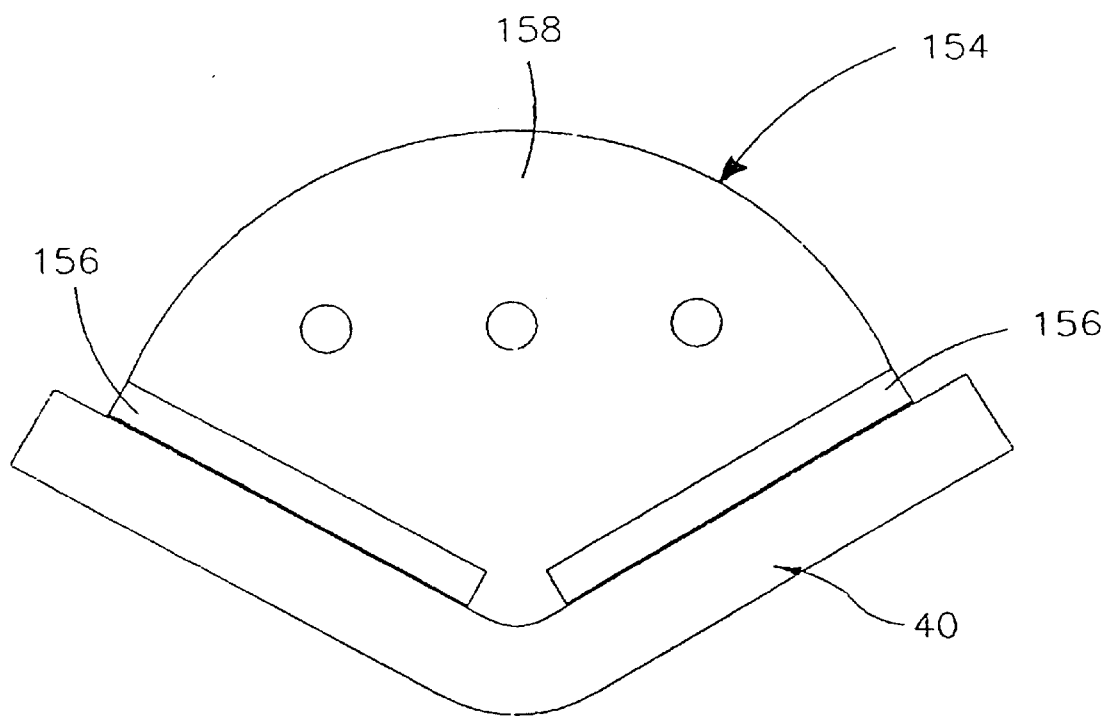
FIG. 7 is a front view of a component of structure facilitating passage of the electrical bus through the structural wall illustrated in FIGS. 5 and 6.

FIG. 7 illustrates an end connector for bus 10 according to the invention. The end connector is designated generally 154 and is preferably formed as a single integral piece. End connector 154 includes two feet 156 which are preferably welded to conductive member 40. End connector 154 further includes a flange portion 158 having apertures formed therein with flange 158 being of planar configuration and generally perpendicular to feet 156. Flange 158 and the apertures therein, extending in an upstanding position from conductive member 40, facilitates attachment of a suitable strand 132 and electrical connection thereof to conductive member 40 by either welding or bolting.

Figure 8:
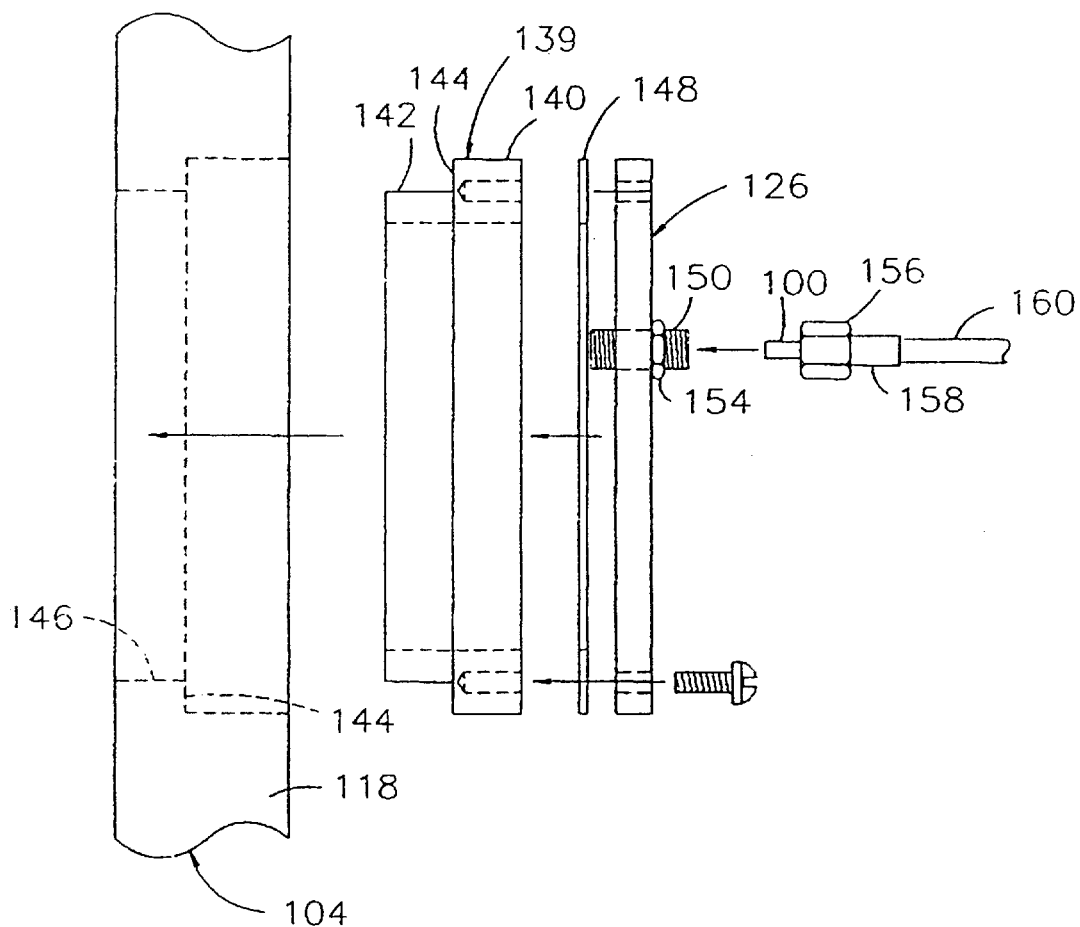
FIG. 8 is an enlarged broken exploded detail view, taken at the area of circle 8 in FIG. 5, illustrating a fiber optic cable optionally forming a portion of an electrical bus according to the preferred embodiment of the invention and showing the manner in which the fiber optic cable passes through a structural wall with the electric bus.

FIG. 8 illustrates an assembly, referred to generally as a fiber optics panel mounting assembly, facilitating passage one or more of fiber optic cables through the structural wall or bulkhead 102 when fiber optic cables are provided as a portion of bus 10. In FIG. 8, the insulator material portion 118 of bonded insulative member 104 is illustrated. As further shown in FIG. 8, a fiber optics panel mounting member 139 includes first and second panel mounting member portions 140, 142 where first panel mounting member portion 140 is of larger size about its periphery than second panel mounting member portion 142. The disparity in size between first and second panel mounting member portions 140, 142 results in a shoulder 144 being defined by an inwardly facing surface of first panel mounting member portion 140.

Fiber optics panel mounting member 139 is desirably molded in place in insulator material 118 when bonded insulative member 104 is fabricated. The shoulder configuration provided by first and second panel mounting portions 140, 142 assures that fiber optics panel mounting member 139 will be securely retained when it is molded in place in insulator material 118 when bonded insulative member 104 is fabricated.

Feedthrough panel 126 includes a series of tapped holes for receiving threaded fitments 150 illustrated in FIG. 8. Fitments 150 preferably have external threads for engagement with not only tapped holes 152 in feed-through panel 126, but also for engagement by locking nuts 154 and retention nuts 156 illustrated in FIG. 8. Retention nuts 156 preferably are rotatably mounted on collars 158 fitted about sheaths 160 surrounding fiber optic strands 100.

A gasket 148 effectuates a seal between feed-through panel 126 and panel mounting member 139 when feed-through panel 126 is secured against member 139 with suitable bolts, which have been shown but are not numbered. Feedthrough panel 126 sandwiches gasket 148 against panel mounting member 139 as a result of rotation of screws 162 engaging tapped holes 164 in panel mounting member 139, as illustrated in FIG. 8.

In the embodiments of the invention for carrying three phase electrical power, the conduit may preferably be fabricated of steel, the conductive members of copper and the insulative members of polyester glass.

Figure 11:
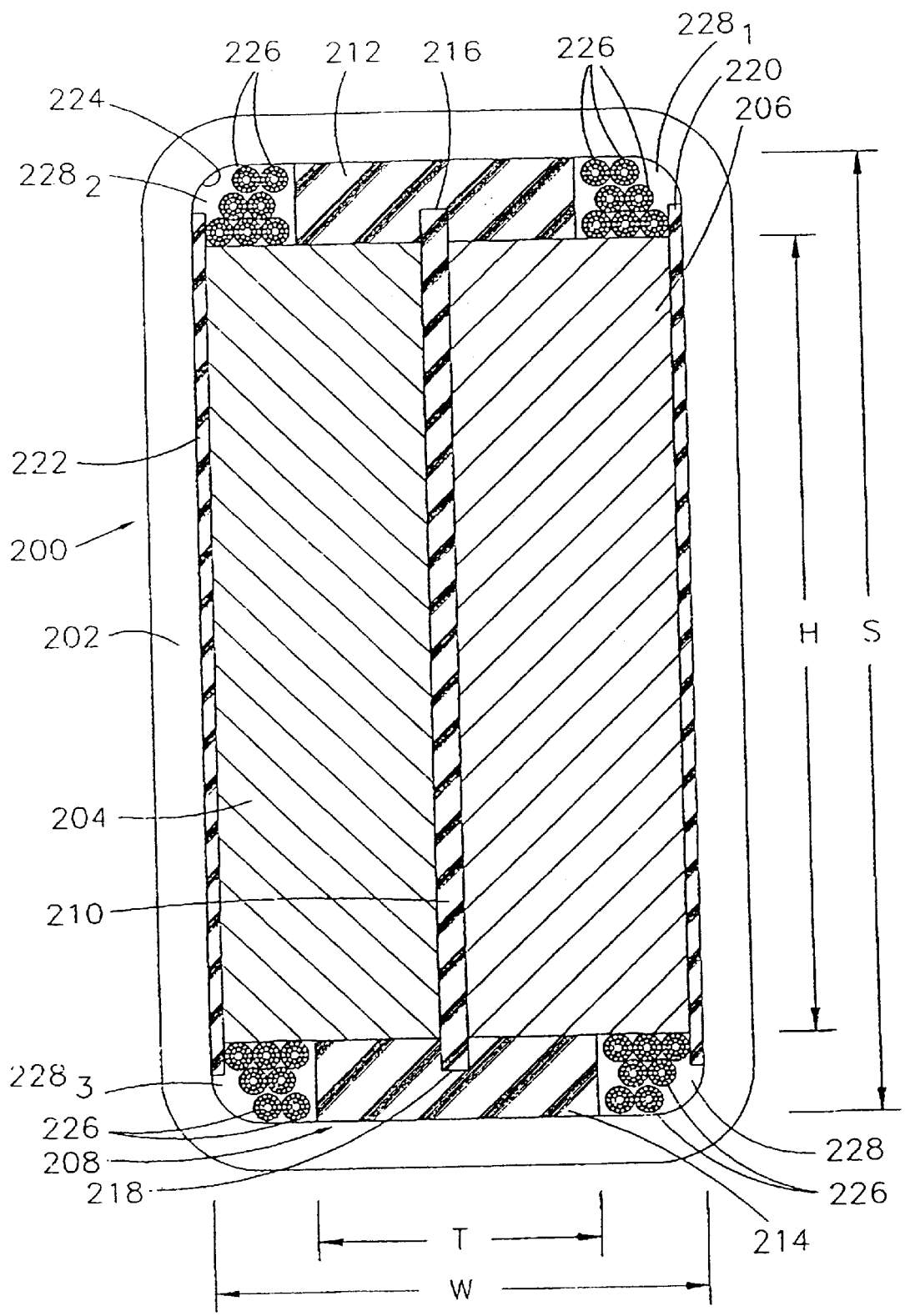
FIG. 11 is an axial cross-sectional view of a preferred embodiment of an electrical bus for carrying direct current power, manifesting aspects of the invention.

Referring to FIG. 11, an embodiment of a compact electrical bus for carrying direct current power is shown in section and is designated generally 200. Bus 200 includes an axially elongated conduit 202 and a pair of axially elongated generally rectangular positive and negative conductive members, designated 204, 206 respectively, within conduit 202. Bus 200 further includes insulative means for maintaining conductive members 204, 206 spaced from conduit 202 and from one another where the insulative means is designated generally 208 in FIG. 11.

Insulative means 208 preferably includes a first axially elongated insulative planar spacer 210 which facingly contacts and separates conductive members 204, 206 one from another. Insulative means 208 further preferably includes a pair of axially elongated insulative blocks 212, 214, each of which preferably has slots formed therein for receiving axially extending edges 216, 218 of first planar spacer 210. Slots in insulative blocks 212, 214 have not been numbered for drawing clarity.

Insulative means 208 further preferably includes a pair of axially elongated second insulative planar spacers, respectively generally designated 220, 222 in FIG. 11, which respectively facingly contact the inner surface 224 of conduit 202.

Optionally, but desirably, DC bus 200 further preferably includes at least one axially elongated fiber optic cable 226 within conduit 202. Cable 226 resides within an axially elongated passageway resulting from the transverse length of second insulative block 214, denoted by dimensional arrow T in FIG. 11, being less than the interior width of rectangular conduit 202, denoted W in FIG. 11; the axially elongated passageway 228 also results from height of conductive member 206, shown by dimension H in FIG. 11, being less than overall inner height of conduit 202 denoted by dimension S in FIG. 11. Preferably, a plurality of fiber optic cables 226 reside in axially elongated passageway 228 and even more preferably further pluralities of fiber optic cables 226 reside in additional axially elongated passageways $228_1$, $228_2$ and $228_3$ resulting from dimensions T and H being respectively less than dimensions W and S as illustrated in FIG. 11.

Figure 12:
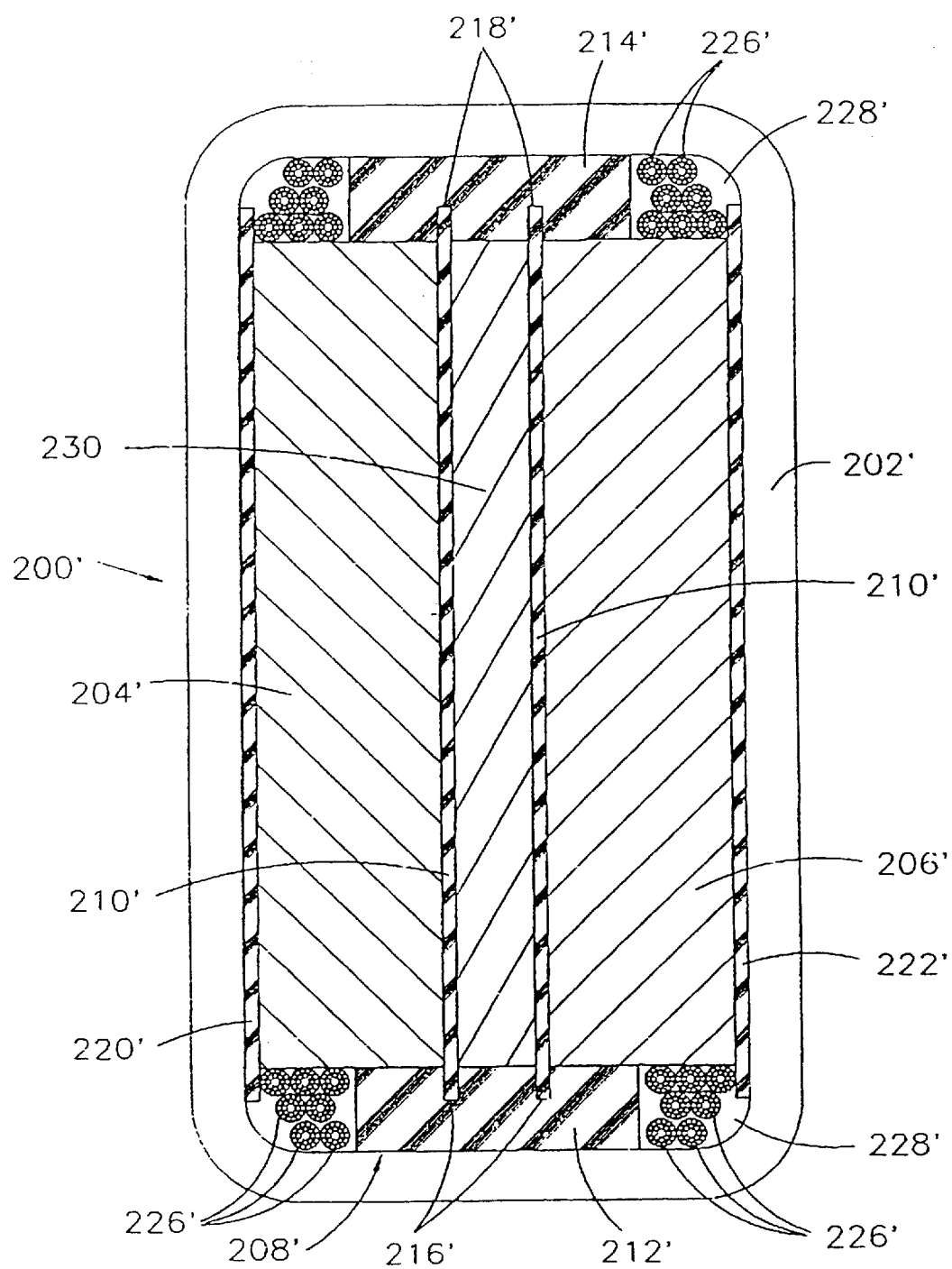
FIG. 12 is an axial cross-sectional view of a second preferred embodiment of an electrical bus for carrying direct current power manifesting aspects of the invention.

A second embodiment of modular direct current bus in accordance with the invention is illustrated in FIG. 12. In this embodiment, the direct current bus is designated generally 200' and includes a conduit 202' with positive and negative conductive members 204', 206' respectively within conduit 202'.

As with the embodiment illustrated in FIG. 11, bus 200' illustrated in FIG. 12 includes insulative means 208' for maintaining conductive members 204', 206' spaced from conduit 202' and from each other. Bus 200 further includes a third conductive member 230. During normal operation of bus 200', conductive member 204 will be of positive polarity, conductive member 206' will be of negative polarity and conductive member 230 will be of neutral or grounded polarity.

Insulative means 208' of DC bus 200' further includes a pair of first planar spacers 210' respectively separating conductive member 230 from positive conductive member 204' and from negative conductive member 206'. Insulative means 208' yet further includes first and second insulative blocks 212', 214', each of which in turn includes longitudinally elongated slots for receiving edges 216', 218' of first planar spacers 210'. Insulative means 208' yet further includes second insulative planar spacers 220', 222' which respectively space and insulate positive conductive member 204' and negative conductive member 206' from interior surface 224' of conduit 202'.

Similarly, to DC bus 200, the embodiment of the DC bus illustrated in FIG. 12 as 200' preferably includes fiber optic cables 226' residing in at least one axially elongated passageway 228'. Axially elongated passageway 228' results from the transverse width of second insulative block 214' being less than the interior width of conduit 202' and from the height of negative conductive member 206' being less than the interior height of conduit 202', similarly to the embodiment illustrated in FIG. 11.

In one of the embodiments of the invention directed to the DC bus, the conduit could be about 3½" by 6" in cross-sectional dimension. The bus could weigh about 50 pounds per linear foot and have a capacity of about 4,000 amps at about 740 volts.

Figure 13:
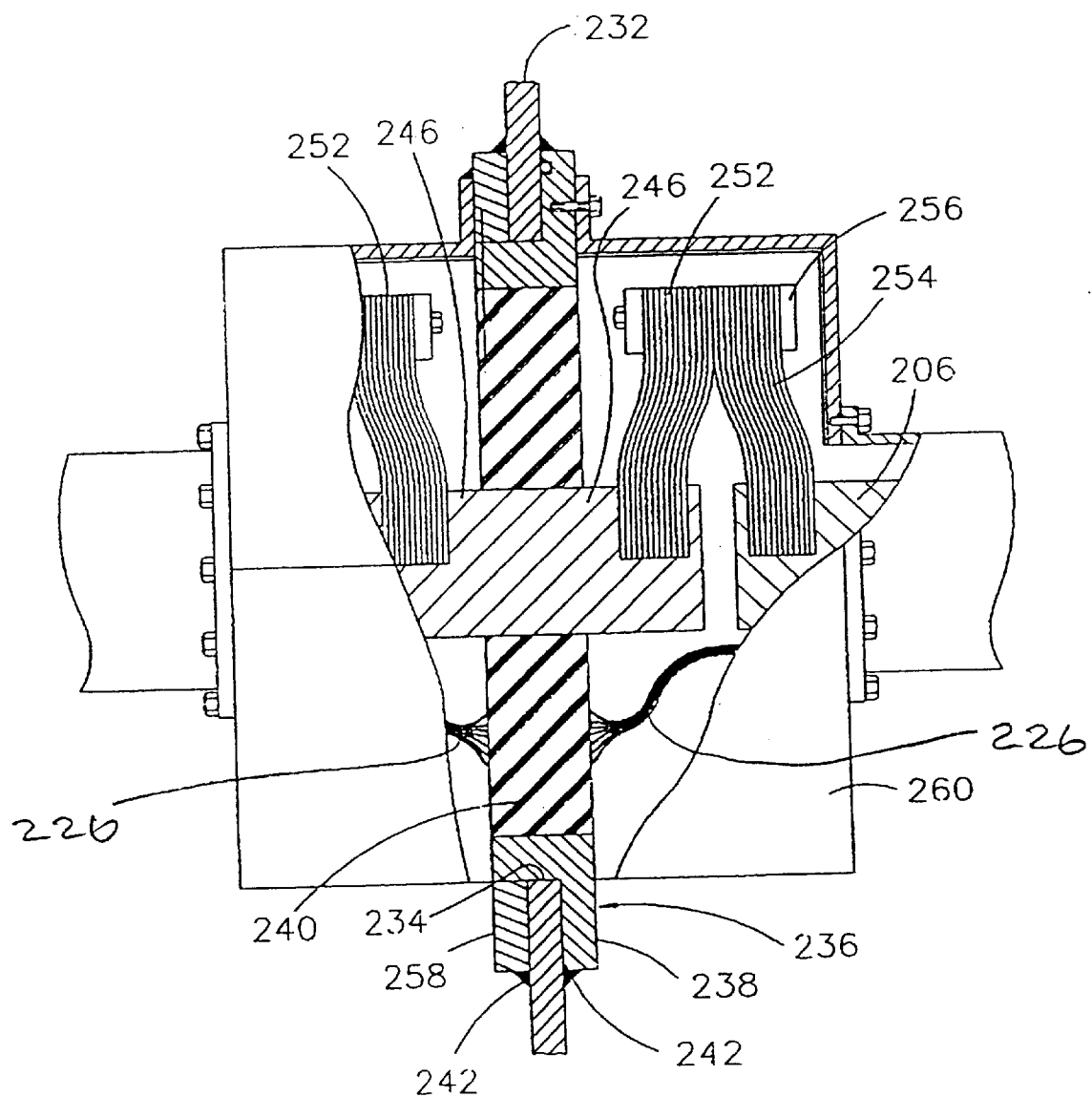
FIG. 13 is a side view, partially broken away and partially in section, illustrating a preferred embodiment of structure facilitating passage through a structural wall of a direct current electrical bus which includes fiber optic transmission lines.

Structure utilized for electrical connection of two segments of a direct current electrical bus embodying aspects of the invention through a structural wall is illustrated in FIGS. 13 through 17. In this regard, the structure illustrated in FIG. 13 is analogous to that illustrated in FIG. 5 for the three phase electrical bus.

Referring to FIG. 13, a structural wall or bulkhead 232 has an opening cut therethrough with the periphery of the opening designated 234 in FIG. 13.

A bonded insulative member designated generally 236 in FIG. 13 is fitted into the opening defined by periphery 234 in wall or bulkhead 232. Bonded insulative member 236 is illustrated in greater detail in FIGS. 14, 15 and 16 and preferably includes a support ring 238 preferably fabricated of metal, with an insulator material 240 bonded to and within ring 238. Support ring 238 is preferably welded to wall or bulkhead 232 via welds 242 illustrated in FIG. 13.

Figure 14:
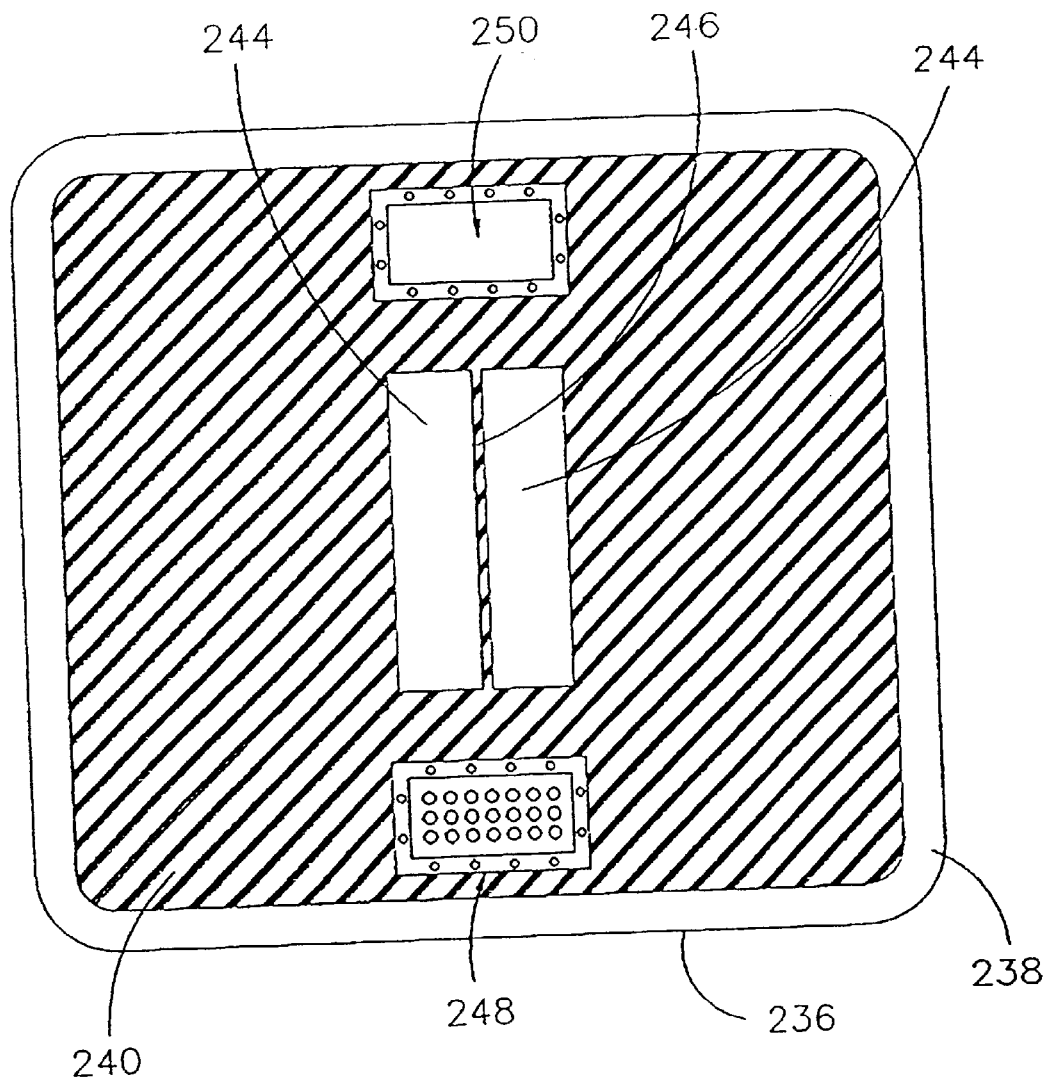
FIG. 14 is a sectional view taken at lines and arrows 14—14 in FIG. 13.

Referring generally to FIG. 14, bonded insulative member 236 further includes two or three conductive members 244 positioned generally at the center of insulative member 236 and spaced from one another by thin layers of insulator material 246; bonded insulative member includes two conductive members in the embodiment illustrated in FIG. 14. (The FIG. 14 embodiment would be used for passage through a structural wall or bulkhead to connect DC buses of the embodiment illustrated in FIG. 11; bonded insulative member 236 would include three conductive members 244 if two DC buses of the embodiment illustrated in FIG. 12 were connected.)

Conductive members 244 and insulator material 240, including the thin layer of insulator material 246, are bonded together as the insulator material indicated as 240 and 246 is fabricated within support ring 238. Conductive members 244 are preferably of the same size and cross-sectional shape as corresponding conductive members of the two DC buses being electrically connected and which are disposed on either side of structural wall or bulkhead 232.

The layer of insulator material 246 which separates respective conductive members is preferably substantially the same size and cross-section as the first planar spacer or spacers separating conductive members in the respective DC buses being connected together through the structural wall. Conductive members 244, together with the layer(s) of insulator material 246 between respective conductive members 244, define a bus feed-through member.

Bonded insulative member 236 yet preferably further includes at least one fiber optic feed-through panel. One such panel has been illustrated in place in FIG. 14 and has been designated generally 248. In the embodiment of bonded insulative member 236 illustrated in FIG. 14, provision has been made for a second fiber optics feed-through panel, which may be provided in place of blank panel 250 if desired.

Figure 17:
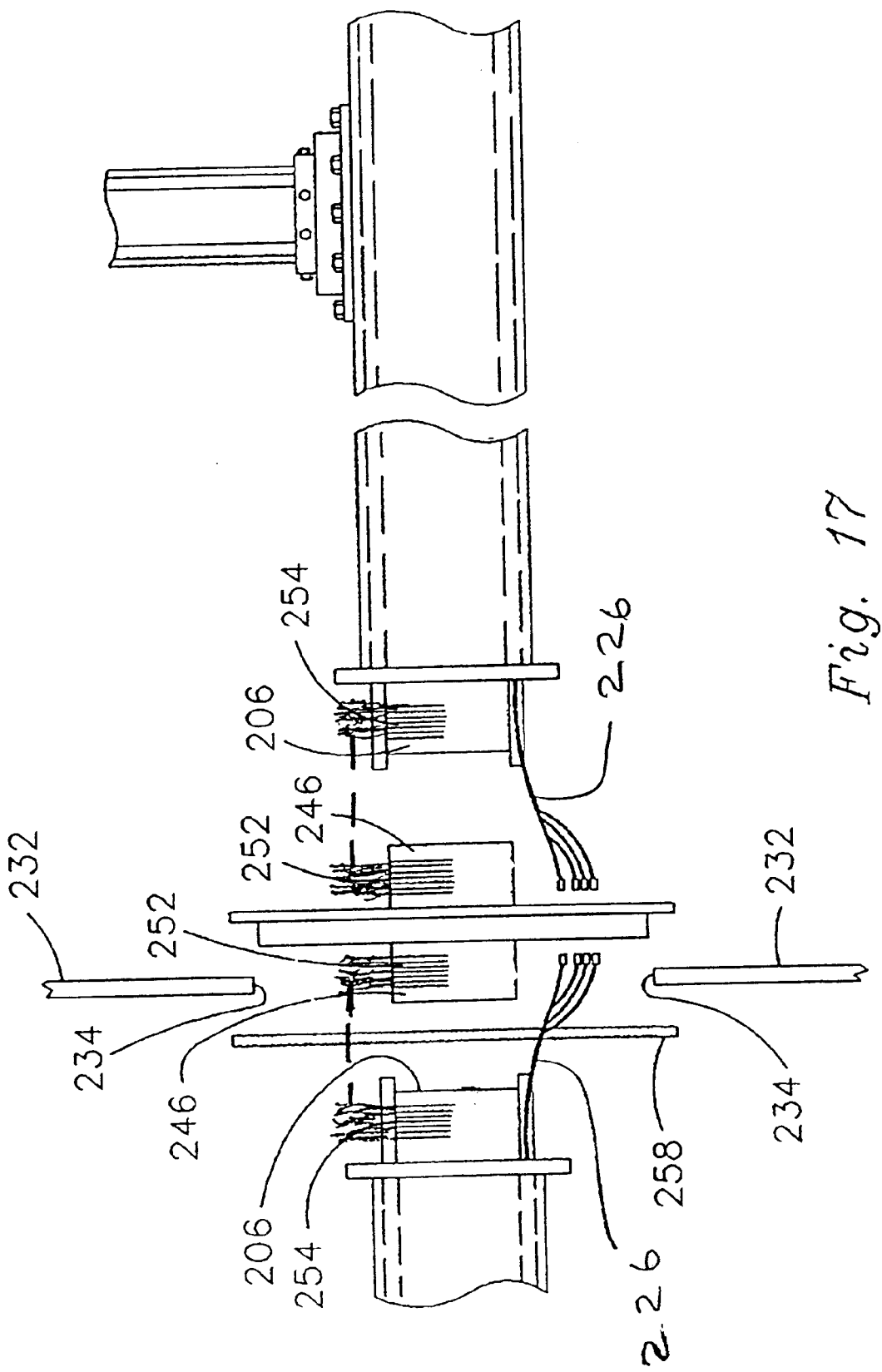
FIG. 17 is an exploded side view of structure facilitating passage through a structural wall of an electrical bus for carrying direct current, as shown generally in FIG. 13.

As shown in FIGS. 13 and 17, once bonded insulative member 236 is in place, electrical connection is effected between respective conductive members 204, 206 of bus 200 and conductive members 246 of bonded insulative member 236 via flexible strands 252, 254. Preferably, flexible strands 252, 254 are electrically connected, most preferably by welding, to lateral extremities of conductive members 204, 206 and 244, with separate conductive strands being welded to each of the respective lateral extremities of conductive members 204, 206 and 244, as depicted in FIGS. 13 and 17. Where two DC buses of the embodiment illustrated in FIG. 12 are connected, flexible strands are welded to vertical extremities of the neutral or ground conductive member and to the corresponding conductive member 244 located centrally within bonded insulative member 236.

Respective co-angularly positioned first and second strands 254, 254 are connected together with a bolt connector 256 as illustrated generally in FIG. 13 and in a manner similar to that in which first and second strands 132, 134 are connected together with bolt connector 136 as illustrated generally in FIG. 5. Bolt connector 256 has not been illustrated in FIG. 17 to aid drawing clarity.

As illustrated in FIGS. 13 and 17, further provided as a portion of the structure via which two DC buses may be connected through a wall or bulkhead is second support ring 258. This second support ring is preferably of substantially the same diameter as first support ring 238 forming a portion of bonded insulative member 236. Second support ring 258 has sufficiently large inner diameter so that second support ring 258 does not interfere with any of the bus connection structure located within its inner periphery.

Respective pairs of flexible strands defined by strands 252, 254 are connected by a bolt connector 256 and are angularly aligned with respect to the center line of the conduit. Most desirably, when the bus configuration illustrated in FIG. 11 is used, the respective pairs of flexible strands connecting positive conductive and negative conductive members are preferably angularly spaced 180 degrees apart about the center line of the conduit. When the DC bus of the embodiment illustrated in FIG. 12 is used, the respective pairs of strands connecting respective positive, negative and neutral or ground conductive members are preferably angularly spaced at least 90 degrees apart about the conduit center line.

A box or housing 260 may be provided about the structure connecting two DC buses through a wall or bulkhead; box 260 may be split substantially along a horizontal plane passing through the center of bus 200.

The conductive members such as 204, 206 and optional conductive member 244 all are preferably formed with notches in the central portions thereof, as generally illustrated in FIG. 15, so that when bonded insulative member 236 is fabricated by molding plastic insulator material 240 in place, the plastic insulator material flows into the notches in conductive members 204, 206 and 244 thereby securing retaining the conductive members in position, all as illustrated in FIG. 15. The same technique and similar structure is used respecting the other embodiments of the invention.

FIG. 15 also illustrates the cross-sectional configuration of second support 258 and the cross-sectional configuration of first support ring 238 which includes a rib 262 extending radially inwardly therefrom. Rib 262 protrudes into insulator material 240 when the plastic insulator material is molded into place, thereby effecting a rigid structural connection between insulator material 240 and first support ring 238.

Figure 16:
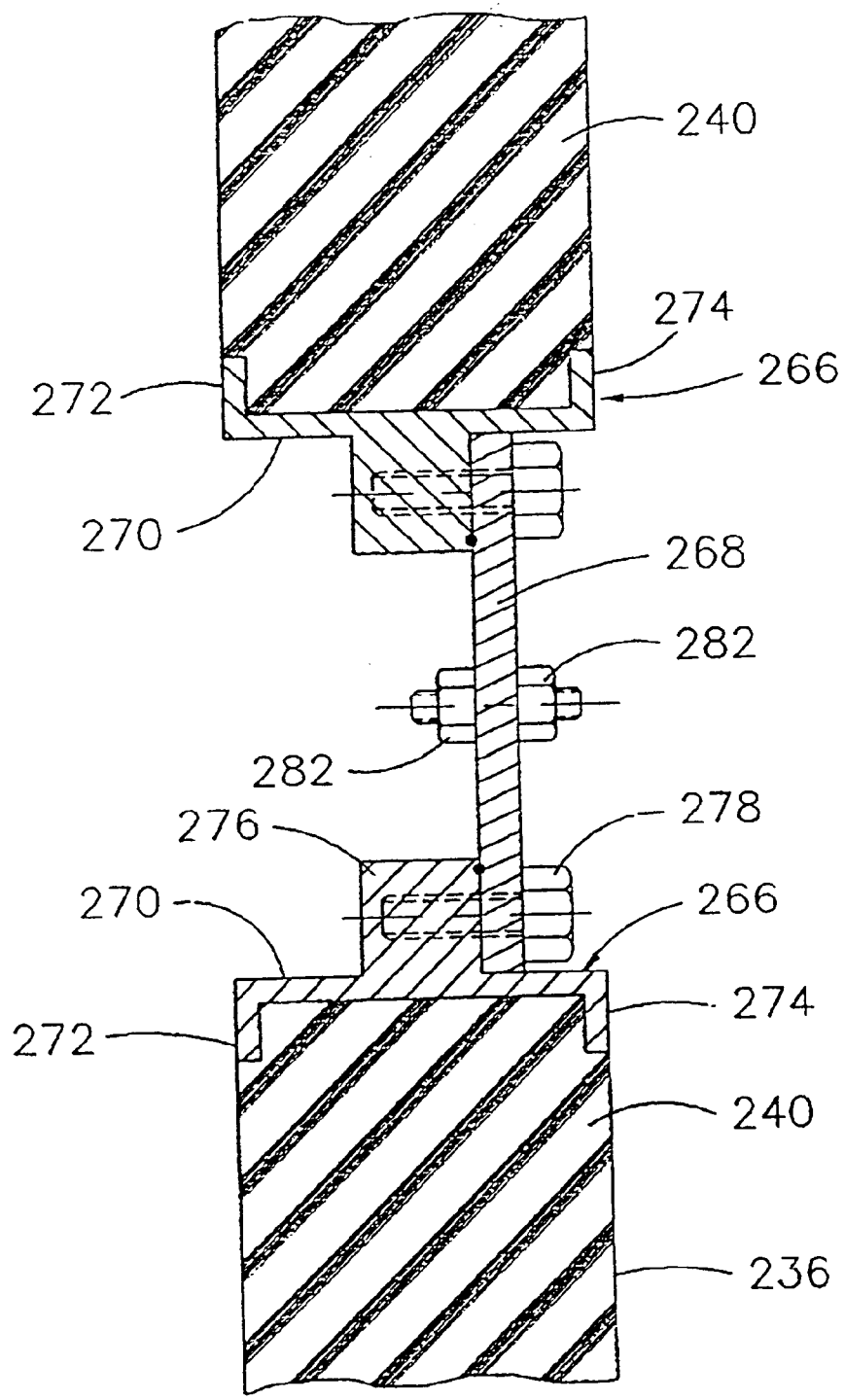
FIG. 16 is an enlarged broken sectional view taken at the area of circle 16 in FIG. 13.

FIG. 16 illustrates an assembly, referred to generally as a fiber optics panel mounting assembly, facilitating passage of fiber optic cables through the structural wall or bulkhead 232 when fiber optic cables are desirably provided as a portion of bus 200 or 200'. In FIG. 16, insulative material portion 240 of bonded insulative member 236 is illustrated. As further shown in FIG. 16, a fiber optics panel mounting member designated generally 264 includes first panel mounting member portion 266 and second mounting member portion 268 which is of generally plate-configuration.

First panel mounting member 266 is annular in form and generally includes a central or base portion 270 with flanges 272, 274 extending radially outwardly therefrom to define, together with central portion 270, a receptacle for insulator material 240 when fiber optics panel mounting member 264 is molded in place. (The generally annular configuration of first panel member 266 is apparent from FIG. 14 in which flange 272 is visible as being generally parallel and substantially coplanar with insulator material 246.)

First panel mounting member 266 further includes an annular shoulder 276 extending radially inwardly generally from the center of base portion 270.

Annular shoulder 276 provides mounting structure, specifically receptacles, for second panel mounting member portion 268 which is secured to shoulder 76 via machine screws or bolts 278. Second panel mounting member portion 268 includes apertures therethrough in which preferably externally threaded sleeves reside, secured by respective nuts 282 on respective sides of second panel mounting member portion 268. In the fiber optics panel mounting member assembly, second panel mounting member portion fits facingly against axially facing, radially inwardly extending surfaces of shoulder 276. Respective radially outboard edges or surface portions of second panel mounting member portion 268 additionally facingly contact the radially inwardly facing annular surface portion of first panel mounting member portion 266. These various surfaces have not been numbered in FIG. 16 to enhance drawing clarity.

Figure 18:
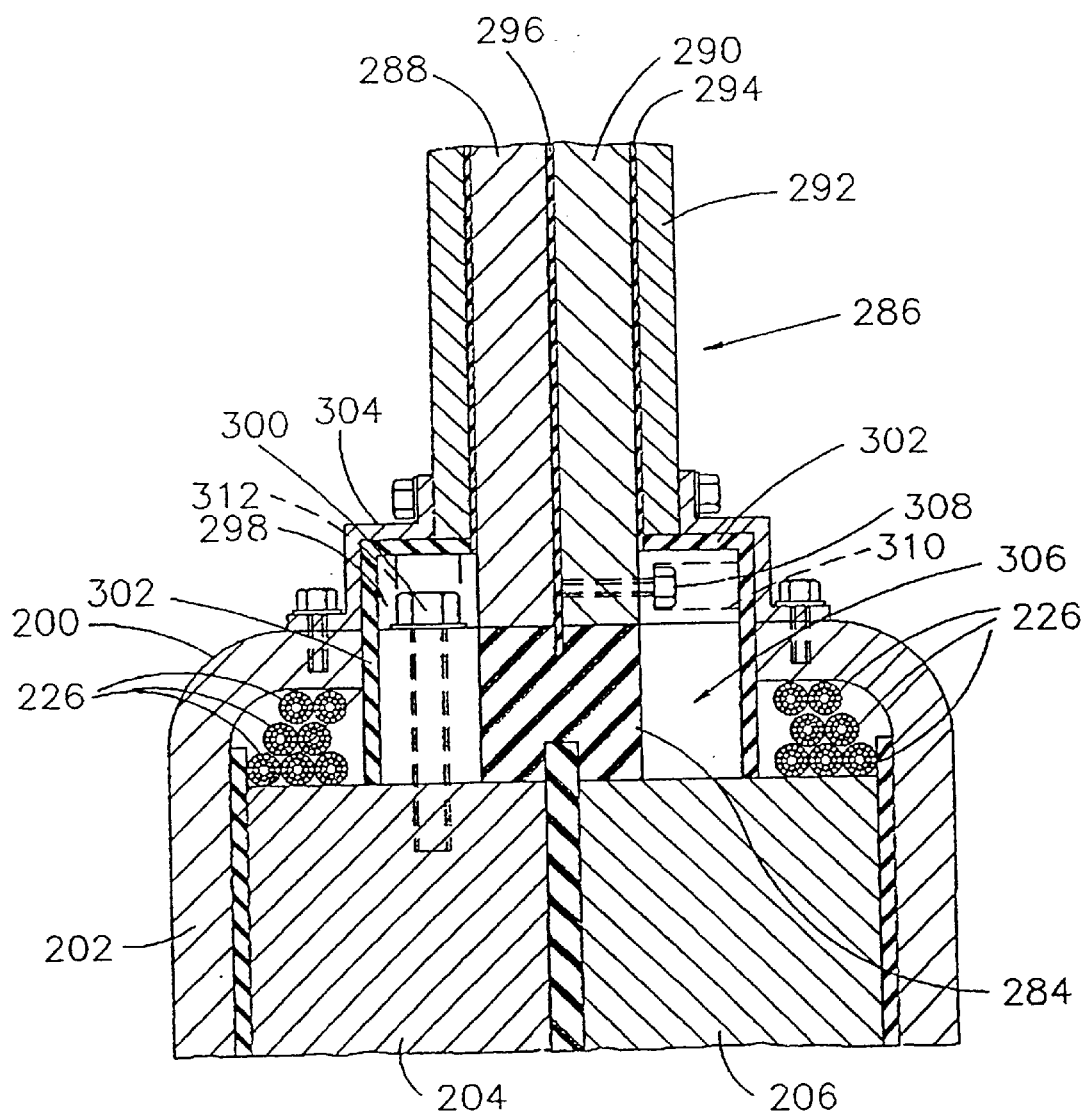
FIG. 18 is a broken vertical cross-section of the embodiment of a bus for carrying direct current as shown in FIG. 11, illustrating breakout structure for connecting the bus to a source or a user of direct current.

Structure facilitating electrical connection of the positive and negative conductive members 204, 206 of bus 200 illustrated in FIG. 11 is depicted in FIG. 18. This breakout structure facilitating connection of conductive members 204, 206 with either a power source or a power consumer may be provided at selected positions along bus 200.

At such a breakout position, first insulative block 212 is replaced by a similar, but narrower insulative spacer block 284. The electrical line or connection bus to which bus 200 is electrically connected is designated generally 286 and includes positive and negative conductive members 288, 290 respectively. Connector bus 286 further includes an outer sleeve 292, an insulative inner sleeve 294 and an insulative separator 296 between conductive members 288 and 290.

Electrical connection between positive conductive member 288 of connector bus 286 and positive conductive member 204 of bus 200 is effectuated by positive breakout connector block 298 which facingly contacts both positive conductive member 288 and conductive member 204. Positive breakout connector block 298 is retained in place via a machine screw 300 residing in a bore formed in conductive member 204. If conductive member 204 is copper or some other relatively soft conductive material, an insert of harder material may be placed in the bore in order that threads formed in the insert will be strong and machine screws 300 will be securely retained in place; this enhances structural integrity of the bus assembly.

The preferably planar surfaces of positive breakout connector block 298 which respectively contact similarly preferably planar surfaces of conductive member 204 and positive conductive member 288 have not been numbered in FIG. 18, to enhance drawing clarity.

Figure 19:
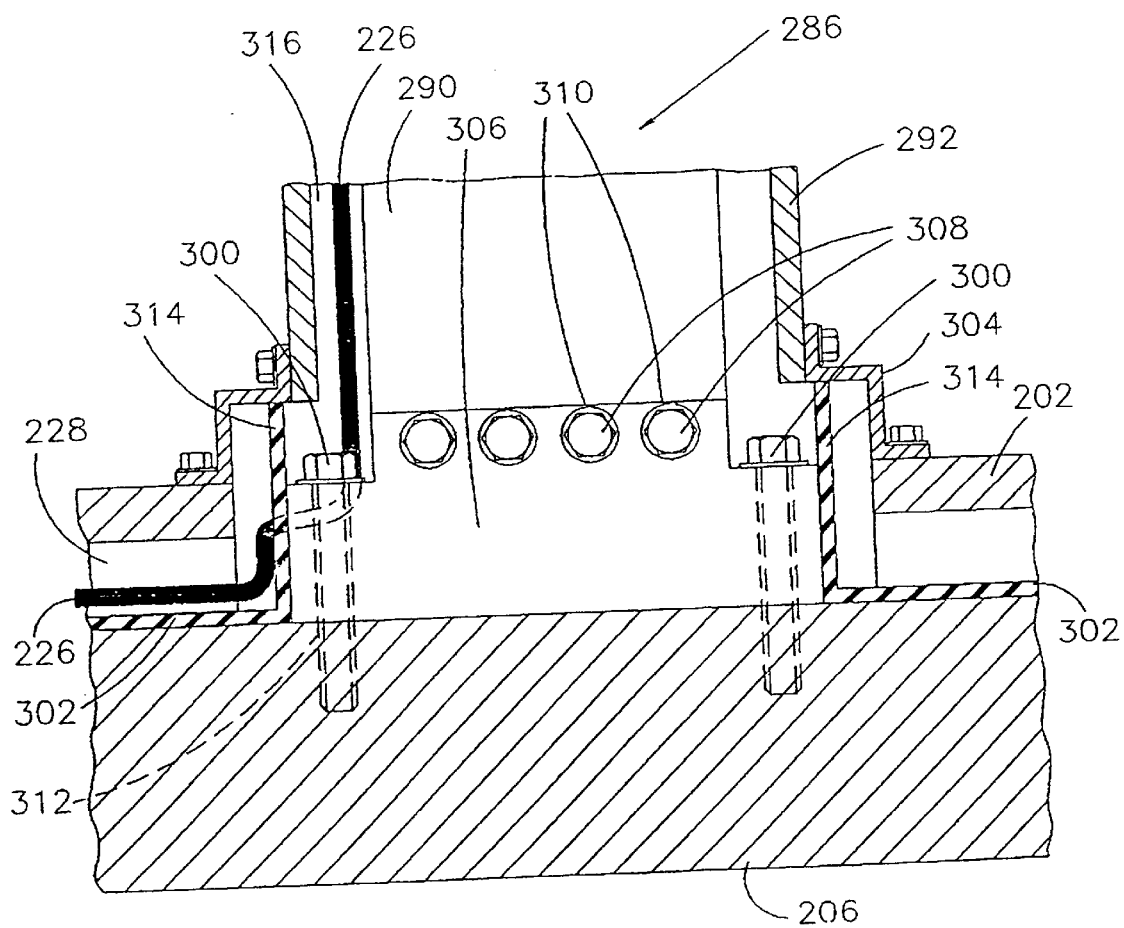
FIG. 19 is an enlarged broken sectional view taken at lines and arrows 19—19 in FIG. 18.

An L-shaped insulative spacer 302 fits over positive breakout connector block 298, insulating breakout connector block 298 from conduit 202, from outer sleeve 292 of connector bus 286 and from an external coping piece 304 which is provided to lend the requisite mechanical structural rigidity to the electrical connection of connector bus 286 and DC bus 200. External coping piece 304 is preferably sheet metal formed to the shape illustrated in FIGS. 18 and 19 is preferably retained in place by suitable screws, not numbered in FIGS. 18 or 19, which desirably engage insulative outer sleeve 292 and conduit 202.

Negative conductive member 290 of connector bus 288 is similarly electrically connected to negative conductive member 206 by a negative breakout connector block 306 which is in turn shielded from the ambient by an insulative spacer 302 and a coping piece 304. Negative breakout connector block 306 is retained in place in flush, facing contact with negative conductive member 290 by a machine screw 308 received by a suitable horizontal bore in negative breakout connector block 306 and which threadedly engages negative conductive member 290.

As with positive breakout connector block 298, negative breakout connector block 306 has preferably planar surfaces which respectively flushly, facingly contact corresponding preferably planar surfaces of negative conductive member 290 and conductive member 206.

Machine screw 308 resides within bore 310 formed horizontally in negative conductive member 290 as illustrated in FIG. 18. Similar horizontal bores are formed in positive connector block 298. The vertical bore 312 formed in positive breakout connector block 298 is formed at a longitudinal position in positive breakout connector block 298 somewhat removed from the longitudinal position at which a horizontal bore corresponding to bore 310 is formed. Similarly, negative breakout connector block 306 includes at least one vertical bore corresponding generally to bore 312 where such a vertical bore is longitudinally displaced from horizontal bore 310 to ensure structural strength and rigidity negative connector block 306.

In FIG. 19, the construction of negative breakout conductor 306 and its position respecting negative conductive member 290, conductive member 206 and fiber optics cable 226 is illustrated. (In FIG. 19, the longitudinal direction is the horizontal direction shown in the drawing figure, whereas in FIG. 18, the longitudinal direction is the direction perpendicular to the plane of the paper.) In FIG. 19, the longitudinal spacing of machine screws 300 from machine screws 308, resulting from the longitudinal spacing of vertical bores 312 from horizontal bores 310 formed in negative breakout conductor 306 is clear.

Further apparent from FIG. 19 is the configuration of insulative spacer 302 which separates one or more fiber optics cables 226 (only one of which is illustrated in FIG. 19) from negative conductive member 206 of bus 200. Insulative spacer 302 provides vertical support for coping piece 304; this vertical support is also apparent from FIG. 18. A suitable gap in a vertically upstanding wall portion 314 facilitates feedthrough of fiber optics cable 226 and further facilitates communication between axially elongated passageway 228 of bus 200 and a similar vertically extending passageway 316 of connector bus 286.

Preferably, the conductive members of the invention are fabricated of copper. However, aluminum or even silver may also be used as may other conductive materials.

A major advantage provided by the invention in all of its embodiments is that all components of the particular current being carried are in one compact package as opposed to use of conventional individual cables. Conventional cables must be provided with stuffing tubes where they pass through a wall or bulkhead. In the instant invention, the bus is actually fabricated effectively as a piece of or built into the wall or bulkhead. The bus is preferably welded in place after being checked for structural integrity and, in nautical applications, for water-tight integrity.

In all of the embodiments of the invention, the conduit is preferably steel, especially when used in nautical applications, to protect the bus from shrapnel. The conduit may also be aluminum or even plastic. The insulative members separating the conductive members may be epoxy, polyester, teflon, nylon or even ceramic. In this regard, inorganics are preferable to avoid any charring in the event of dielectric effects. Inorganic materials do not produce smoke since there is no charring.

Respecting the facingly contacting surfaces of the respective conductive and insulative members, there is no need for bonding at such surfaces for purposes of achieving mechanical strength characteristics; however, there may bonding provided at such surfaces for thermal conductance at such interfaces.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as the subject matter defined literally by the claims, so long as such substantial equivalents, as defined by a claim for such substantial equivalent, do not read on the prior art.

The following is claimed:

1. A modular direct current bus comprising:
   a. an axially elongated generally rectangular conduit;
   b. a pair of axially elongated generally rectangular positive and negative conductive members within said conduit;
   c. insulative means for maintaining said conductive members spaced from said conduit and from each other, comprising:
      i. a first axially elongated insulative planar spacer facingly contacting and separating said conductive members one from another: and
      ii. a pair of axially elongated insulative blocks engaging respective axially extending edges of said first axially elongated insulative spacer, facingly contacting respective surfaces of said positive and negative conductive members which are transverse to said conductive member surfaces contacting said planar spacer:
   d. axially elongated fiber optic cable within said conduit and residing within an axially elongated passageway resulting from transverse length of insulative blocks being less than combined transverse length of said conductive members.

2. A modular direct current bus, comprising:
   a. an axially elongated conduit;
   b. axially elongated conductive members within said conduit;
   c. insulative means for maintaining said conductive members spaced from said conduit and from each other comprising:
      i. axially elongated insulative planar spacers facingly contacting and separating said conductive members one from another;

ii. axially elongated insulative blocks for engaging said axially elongated insulative planar spacers, facingly contacting said conductive members;

d. fiber optic cable within said conduit residing within a passageway resulting from length of insulative blocks being less than combined length of said conductive members.

3. An electrical bus for carrying D.C. power along a path through a structural wall, comprising:

a. a pair of compact low inductance electrical bus structures, each comprising:
      i. an axially elongated conduit;
      ii. axially elongated conductive members within said conduit;
      iii. insulative means for maintaining said conductive members spaced from said conduit and from each other, comprising:
         (1) axially elongated insulative planar spacers facingly contacting and separating said conductive members one from another;
         (2) axially elongated insulative blocks for engaging said axially elongated insulative planar spacers, facingly contacting said conductive members;
   b. said bus structures being substantially axially aligned for carrying power along said path on opposite sides of said wall;
   c. means for electrically connecting respective corresponding said conductive members of said respective bus structures through said wall, comprising:
      i. a coupling member adapted for close fitting within a wall aperture of preselected size and shape, bonded to said wall;
      ii. an axially elongated insulative member passing through said coupling member proximate the axis of said bus structures;
      iii. axially elongated conductive means for carrying respective polarities of said D.C. power through said coupling member substantially coaxially with said insulative member; and
      iv. flexible means for connecting said respective conductive members of said respective bus structures with portions of said conductive means for carrying respective polarities of said D.C. power.

4. The bus of claim 3 wherein said flexible means further comprises stranded conductive bundles respectively connected to corresponding said conductive means and said conductive members at substantially common angular positions and extending substantially radially therefrom.

5. A modular direct current bus, comprising:

a. an axially elongated conduit having planar sides;
   b. axially elongated generally rectangular positive and negative conductive members within said conduit;
   c. insulative means for maintaining said conductive members spaced from said conduit and from each other, comprising:
      i. axially elongated insulative spacer means facingly contacting and separating said conductive members one from another;
      ii. axially elongated insulative blocks engaging respective axially extending edges of said axially elongated insulative spacer means, facingly contacting respective surfaces of said positive and negative conductive members which are transverse to said conductive member surfaces contacting said spacer means, respectively facingly contacting respective single planar interior surfaces of said conduit, respective blocks being of transverse length along said contacted surfaces less than that of said contacted conduit surface to define longitudinal voids within said conduit at juncture of said contacted planar surface with another planar surface of said conduit proximate transverse extremities of said blocks, and
   d. axially elongated signal transmission cable residing in said longitudinal voids and extending the length thereof within said conduit.

6. A modular direct current bus, comprising:

a. an axially elongated generally rectangular conduit;
   b. a pair of axially elongated generally rectangular positive and negative conductive members within said conduit;
   c. insulative means for maintaining said conductive members spaced from said conduit and from each other, comprising:
      i. a first axially elongated insulative planar spacer facingly contacting and separating said conductive members one from another, and
      ii. a pair of axially elongated insulative rectangular blocks engaging respective axially extending edges of said first axially elongated insulative spacer, facingly contacting respective surfaces of said positive and negative conductive members which are transverse to said conductive member surfaces contacting said planar spacer and respectively facingly contacting opposed interior surfaces of said conduit, said blocks being of transverse length along said facingly contacted surfaces of said conduit less than that of said facingly contacted conduit surface to define longitudinal voids within said conduit at respective ends of said blocks, and
   d. electrical transmission means residing within at least one of said longitudinal voids within said conduit.

* * * * *